(12) United States Patent
Tanaka

(10) Patent No.: US 7,933,029 B2
(45) Date of Patent: Apr. 26, 2011

(54) PRINTING SYSTEM AND PRINTING APPARATUS

(75) Inventor: Satoshi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1106 days.

(21) Appl. No.: 11/675,373

(22) Filed: Feb. 15, 2007

(65) Prior Publication Data
US 2007/0201091 A1 Aug. 30, 2007

(30) Foreign Application Priority Data
Feb. 24, 2006 (JP) .................. 2006-048942

(51) Int. Cl.
*G06F 3/12* (2006.01)
*G06K 15/00* (2006.01)
*G06K 15/02* (2006.01)
(52) U.S. Cl. ............ 358/1.13; 358/1.15; 358/1.16; 358/1.2

(58) Field of Classification Search .............. 358/1.2, 358/1.13, 1.14, 1.15, 1.16; 400/61, 70, 76
See application file for complete search history.

(56) References Cited

U.S. PATENT DOCUMENTS
6,089,765 A * 7/2000 Mori ............................ 400/61

FOREIGN PATENT DOCUMENTS
JP 11-163902 A 6/1999
JP 2005-123826 A 5/2005

* cited by examiner

*Primary Examiner* — Thomas J Lett
(74) *Attorney, Agent, or Firm* — Canon U.S.A., Inc. I.P. Division

(57) ABSTRACT

A printer receives changes to printing conditions by a user when executing reprinting. The printer selects whether to execute reprinting based on application data held in a host computer, or execute reprinting based on printing data held in the printer. If the printer selects executing of reprinting based on application data, the reprint request is sent to the host computer. If the printer selects executing of reprinting based on printing data held in the printer, reprinting is performed based on printing data held in the printer.

10 Claims, 23 Drawing Sheets

FIG. 20

MEMORY MAP OF RECORDING MEDIUM

RECORDING MEDIUM
SUCH AS FD/CD-ROM

| DIRECTORY INFORMATION |
|---|
| FIRST DATA PROCESSING PROGRAM PROGRAM CODE GROUP CORRESPONDING TO FLOW CHART STEP SHOWN IN FIG. 16 |
| SECOND DATA PROCESSING PROGRAM PROGRAM CODE GROUP CORRESPONDING TO FLOW CHART STEP SHOWN IN FIG. 17 |
| THIRD DATA PROCESSING PROGRAM PROGRAM CODE GROUP CORRESPONDING TO FLOW CHART STEP SHOWN IN FIG. 18 |
| FOURTH DATA PROCESSING PROGRAM PROGRAM CODE GROUP CORRESPONDING TO FLOW CHART STEP SHOWN IN FIG. 19 |

PRINTING SYSTEM AND PRINTING APPARATUS

BACKGROUND OF THE INVENTION

1. Field of the Invention

The present invention relates to a printing system and a printing apparatus.

2. Description of the Related Art

With a printing apparatus which receives a print job from an information processing device such as a host computer (hereafter called host) and performs printing processing, sometimes the printed material output by the printing processing is not what the user has desired. In such an event, the user returns to the host, selects the document to be printed again, starts the printing setting screen and sets the desired printing conditions to perform reprinting.

A method has been proposed to improve this complicated situation, by storing the printing data to a storage device within the printing apparatus and reprinting this.

Also, specifying instructions set beforehand as the host by the printing apparatus (for example, instructions for reprinting an entire document (or a portion thereof) which is created by a document creating software and immediately prior instructed to print) and transmitting the specified instructions to the specified host has been proposed (Japanese Patent No. 3274641).

However, with a proposal for saving the above-described printing data in the storage device within the printing apparatus, the printed data is all saved, and therefore only the amount of resources the storage device has can be saved, so there has been a disadvantage wherein the number of reprintable jobs could influence the storage device resources of the printing apparatus. Also, when a setting not changeable at the user interface of the printing apparatus is desired to be changed, there has been a disadvantage of needing to perform complicated operations such as that described above after returning to the host.

Also, with the above-described (Japanese Patent No. 3274641), only the instructions set beforehand could be transmitted. Accordingly, if the user desires that the host execute other processing (such as when a document other than the immediately prior printed document is to be reprinted, or when the user desires to freely change printing settings and perform reprinting), there has been a disadvantage wherein the user must return to the host and perform the complicated operations as described above.

Thus, as means for solving these problems, a "sample printing function" has been proposed. With this function, even after a job is transmitted from the host to the printing apparatus, the printing data of the job is held at the host without deleting it, and the user who has gone to remove the printed material from the printing apparatus side returns to the host, can use the data held therein and can perform reprinting.

This function only saves necessary printing data, and so the burden on the storage device resources is low. However, this function can be used only after this function is selected on a host setting screen in advance before first loading a document to be printed on the printing apparatus, and then performing printing setting.

Accordingly, when loading a document to be printed from the host to the printing apparatus, the user must consciously select this function. With such a situation, this is useful to a user who has mastered the function, but situations can be conceived of a user who does not know the function or who knows the function but has forgotten to select the function and thus loads the job without selecting the function.

Thus, constructing a printing environment which enables reprint jobs as desired by the user without relying on the expert level of the user or the storage device resources of the printing apparatus is desired.

SUMMARY OF THE INVENTION

Embodiments of the present invention have taken the above points into account and provide an improved printing system and printing apparatus.

Further, an embodiment of the present invention provides a printing system and printing apparatus which appropriately selects whether to execute reprinting based on application data held in an information processing apparatus or whether to execute reprinting based on the printing data held in the printing apparatus, according to the printing conditions which are changed at the time of reprinting.

As many apparently widely different embodiments of the present invention can be made without departing from the spirit and scope thereof, it is to be understood that the invention is not limited to the specific embodiments thereof except as defined in the appended claims. Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 20 is a diagram describing a memory map of a storage medium (recording medium) storing various types of data processing programs which are readable with an information processing device and printing apparatus configuring the printing system relating to the first embodiment.

DESCRIPTION OF THE EMBODIMENTS

Figure 1:
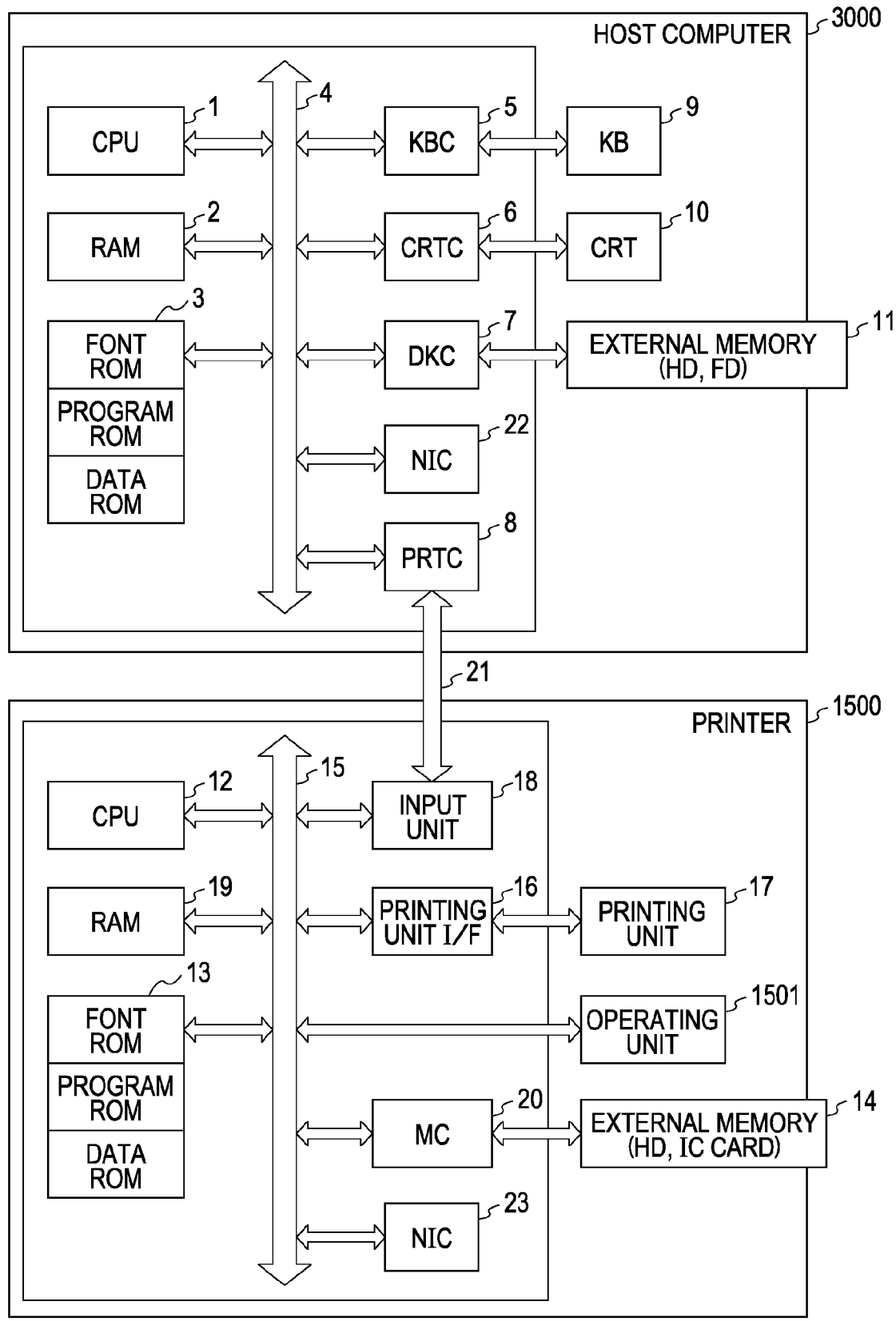
FIG. 1 is a block diagram of an example of a printing system configuration applicable to an embodiment of the present invention.

The present invention will now be described in detail with reference to the drawings showing various embodiments thereof. In the drawings, elements and parts which are identical throughout the views are designated by identical reference numerals, and duplicate description thereof is omitted.

First Embodiment

The embodiments relating to the present invention will be described in detail below with reference to the diagrams.

FIG. 1 is a block diagram of an example of a printing system configuration relating to an embodiment of the present invention.

In FIG. 1, reference numeral 3000 denotes a host computer configured with an information processing device. The host computer 3000 has a CPU 1 for executing document processing wherein diagrams, pictures, text, and charts (including calculation charts) are combined therewithin, based on a document processing program stored in a ROM 3 programming ROM or an external memory 11. The CPU 1 performs overall control of the various devices connected to a system bus 4.

An operating system program serving as a control program for the CPU 1, a printer driver to be described later, and so forth, are stored on the ROM 3 programming ROM or the external memory 11. Also, font data and so forth to be used in the event of document processing is stored on the ROM 3 programming ROM or the external memory 11. Further, various types of data used for the document processing and the like, is stored on the ROM 3 programming ROM or the external memory 11.

A RAM 2 functions as the primary memory, work area, and so forth of the CPU 1.

A keyboard controller (KBC) 5 receives key input from a keyboard 9 or a pointing device or the like. Here, various setting items to be used for poster printing which will be described later is included in the data input via the keyboard 9.

A CRT controller (CRTC) 6 controls a CRT display (CRT) 10. Note that the display device is not limited to a CRT, and may be a liquid crystal display or the like.

A disk controller (DKC) 7 controls access between external memory 11 such as a hard disk (HD), a floppy disk (FD) and so forth. The external memory 11 stores a boot program, various applications, font data, user files, editing files, printer control command generating programs (hereafter, printer drivers), and so forth.

A printer control (PRTC) 8 is connected to a printer 1500 via a bi-directional interface (interface) 21, and executes communication control processing with the printer 1500. Note that the host computer 3000 may be configured so as to use a network interface card (NIC) 22 to be communicable with the printer 1500 via a network. Also, there may be multiple host computers or printers on the network.

Note that, in an embodiment, the CPU 1 executes outline font rendering (rasterizing) processing to the display information RAM which is set on the RAM 2 for example, enabling the same image as the image to be printed to be displayed on the CRT 10.

Also, the CPU 1 opens various windows which are registered based on commands instructed by a mouse cursor or the like on the CRT 10, and executes various data processing. When the user executes printing, a window relating to print setting is opened, and the user can perform settings, or set printing processing methods as to the printer driver including selecting printer modes.

The printer 1500 is controlled by the CPU 12. The CPU 12 outputs an image signal serving as output information to a printing unit (printer engine) 17 connected to the system bus 15, via a printing unit interface (I/F) 16, based on control programs and so forth which are stored in the ROM 13 programming ROM or control programs and so forth which are stored in an external memory 14. Also, the control programs and so forth for the CPU 12 are stored in the ROM 13 programming ROM.

Font data to be used when generating the above-mentioned output information is stored in the ROM 13 font ROM. Also, when using a printer with no external memory 14 such as a hard disk and so forth, the information used on the host computer and so forth is stored on a ROM 13 data ROM.

The CPU 12 is configured to enable communication processing with the host computer 3000 via the input unit 18, and so the information within the printer and so forth can be communicated to the host computer 3000. Note that the printer 1500 can be configured to use the network interface card (NIC) 23 to enable communication with the host computer 3000 via a network.

A RAM 19 functions as the primary memory, work area, and so forth of the CPU 12, and is configured so that the memory capacity can be expanded by the option RAM which is connected to an expansion port. In an embodiment, the RAM 19 is used for an output information rendering region, environment data storing region, NVRAM, and so forth.

The external memory 14 denotes a hard disk (HD), IC card, and so forth. This external memory 14 is subjected to access control by a memory controller (MC) 20. The external memory 14 is connected as an option, and stores font data, emulation programs, form data, and so forth.

The external memory 14 should not be limited to only one, but may have several memory devices, and may be configured so that multiple external memory devices which store programs for deciphering built-in fonts and option cards, as well as printer control languages of different languages, can be connected. Further, the external memory 14 may have a NVRAM to store printer mode setting information from an operating unit 1501.

The operating unit 1501 includes a switch for operating, a display device with a touch panel, an LED display device and so forth.

Note that the printing unit (printer engine) 17 may be of a laser beam method or an electronic photograph method other than a laser beam method (such as an LED method). Also, other printing methods such as a liquid crystal shutter method, injecting method, heat transfer method, or a sublimation method can also be applied to the present invention.

Further, the printer 1500 may be an MFP (Multi Function peripheral).

Figure 2:
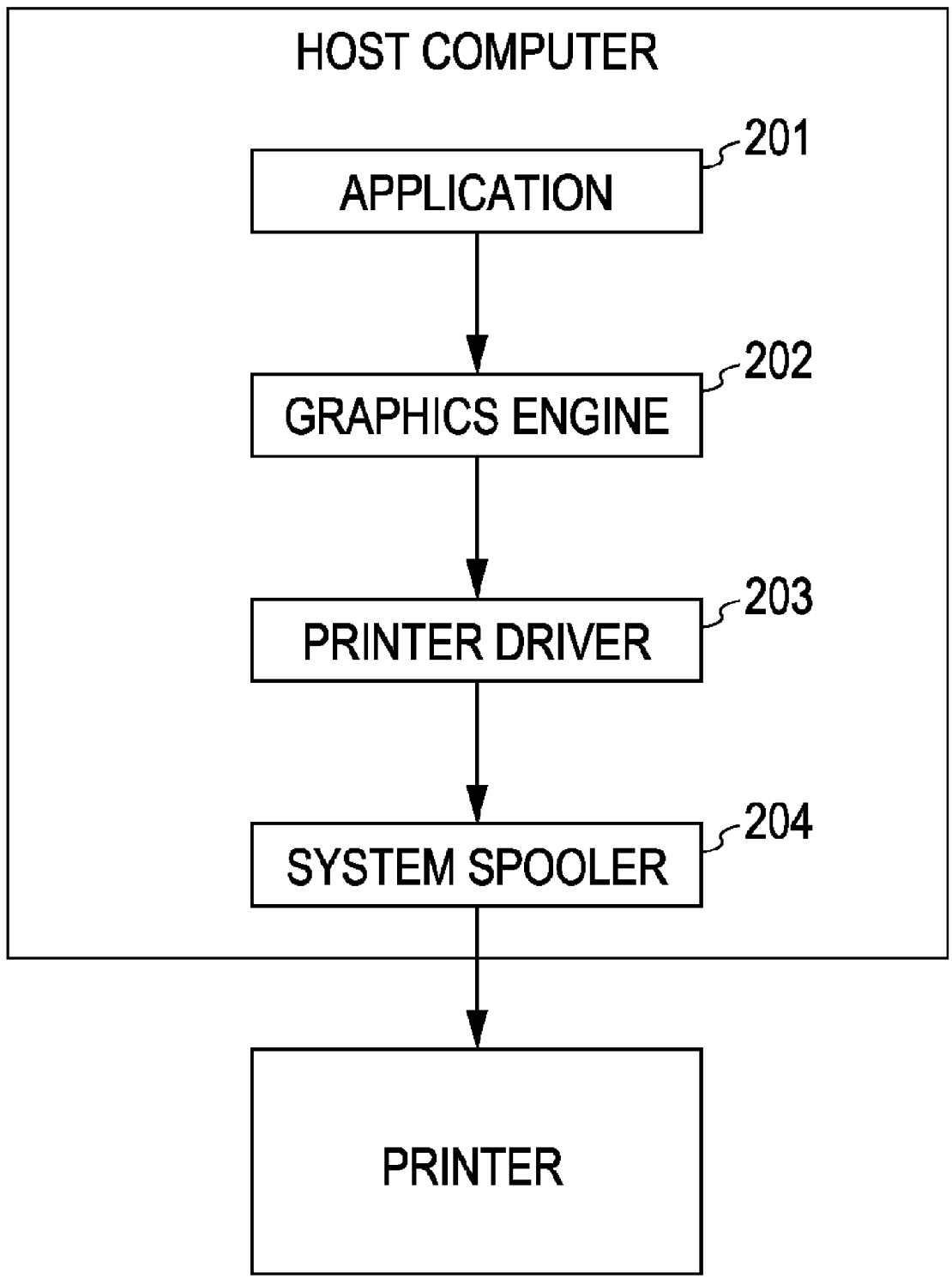
FIG. 2 is a configuration diagram of a typical printing processing configuration with a host computer which can communicate with a printing apparatus such as a printer.

FIG. 2 is a configuration diagram showing a typical printing processing configuration with a host computer which can communicate with the printing apparatus of a printer and so forth.

As shown in FIG. 2, an application 201, graphics engine 202, printer driver 203, and system spooler 204 exist as files which are saved in the external memory 11. Then in the event of being executed, these serve as program modules which are loaded on the RAM 2 and executed by the operating system which is executed by the CPU 1 or the modules used.

Also, the application 201 and printer driver 203 can be added to a FD or CD-ROM of the external memory 11 or to the HD of the external memory 11 via an unshown network.

The application 201 stored in the external memory 11 is loaded on the RAM 2 by the CPU 1 and executed. Then, in the event of printing from this application 201 to the printer 1500, a graphics engine 202, which is similarly loaded on the RAM 2 and is executable, is used to perform output (drawing).

The graphics engine 202 similarly loads a printer driver 203 prepared for each printing apparatus on the RAM 2 from the external memory 11 by the CPU 1, and uses the printer driver 203 to convert the output from the application 201 into a printer control command.

The converted printer control command is arranged to be output to the printer 1500 by way of a system spooler 204 loaded on the RAM 2 by the operating system which is executed by the CPU 1, via an interface 21.

Figure 3:
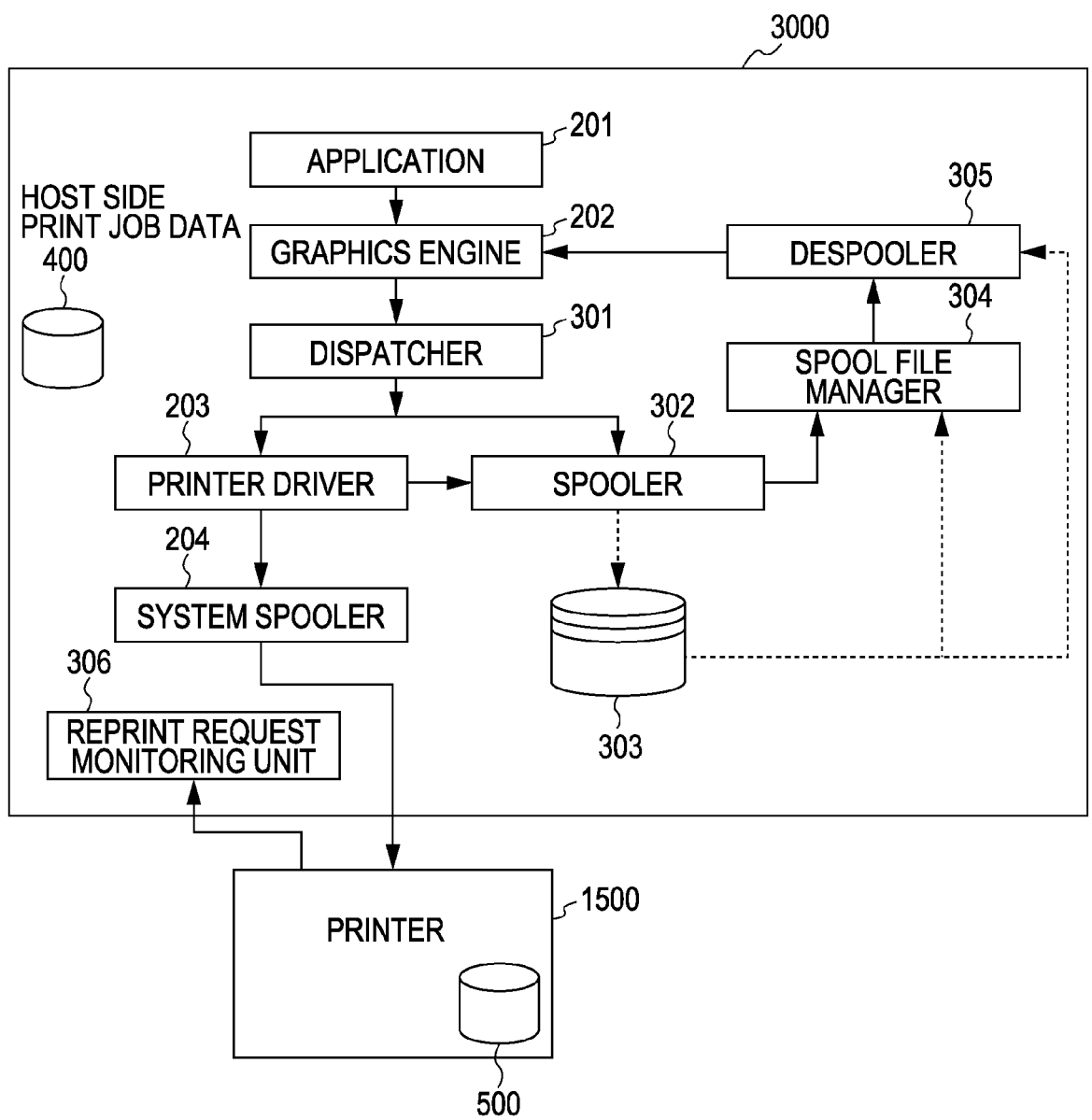
FIG. 3 is a block diagram of an example of a printing processing configuration with the printing system shown in FIG. 1.

The printing system according to the present embodiment has a configuration for temporarily spooling the printing data from the application 201 with intermediate code data as shown in FIG. 3, in addition to a printing system made up of the printer 1500 and host computer 3000 shown in FIG. 2.

FIG. 3 is a block diagram showing an example of the printing processing configuration with the printing system shown in FIG. 1, and has a printing processing configuration wherein the system shown in FIG. 2 is expanded. Note that items similar to those in FIG. 2 have the same reference numerals.

As shown in FIG. 3, the printing processing configuration according to the present embodiment has a configuration to temporarily generate a spool file 303 made up of intermediate code in the event of sending a printing command from the graphics engine 202 to the printer driver 203.

Note that, in an embodiment, with the system shown in FIG. 2, the application 201 is released from the printing processing at the point in time that the printer driver 203 has completed converting all of the printing commands from the graphics engine 202 to the printer control command.

Conversely, with the system shown in FIG. 3, this is at the point in time that the spooler 302 converts all of the printing commands into intermediate code data and outputs to the spool file 303. Normally, the latter can be completed in a shorter time.

Also, with the system shown in FIG. 3, processing can be done with the content in the spool file 303. Thus, functions without applications can be realized, such as shrinking several pages of the printing data from the application 201 into one page and printing this. Also, this enables realizing of an enlarging printing function (poster printing function).

For such objects, the system shown in FIG. 2 has been expanded, such as spooling with intermediate code data, as shown in FIG. 3.

Note that, in an embodiment, in order to perform processing of the printing data, settings are performed from the window (setting screen) provided by the normal printer driver 203, and the printer driver 203 is controlled to stored the setting content thereof to a RAM 2 or external memory 11.

FIG. 3 will now be described in detail. As shown in FIG. 3, with this expanded processing method, the printing command from the graphics engine 202 is received by the dispatcher 301.

The dispatcher 301 loads the spooler 302 stored on the external memory 11 onto the RAM 2 if the printing command received from the graphics engine 202 is the printing command issued from the application 201 to the graphics engine 202. Then, the dispatcher 301 sends the printing command to the spooler 302 instead of the printer driver 203.

The spooler 302 converts the received printing command into an intermediate code and outputs this to the spool file 303. Also, the spooler 302 obtains the processing settings relating to the printing data which is set for the printer driver 203, and saves this on the spool file 303. In an embodiment, the spool file 303 is generated as a file on the external memory 11, but in another embodiment, the spool file 303 may be generated as a file on the RAM 2.

Further, the spooler 302 loads the spool file manager 304 which is stored on the external memory 11 onto the RAM 2, and communicates the spool file 303 generating situation to the spool file manager 304. After this, the spool file manager 304 determines whether or not printing can be performed according to the content of the processing settings relating to the printing data saved on the spool file 303.

In the event that the spool file manager 304 determines that printing can be performed using the graphics engine 202, the de-spooler 305 stored on the external memory 11 is loaded onto the RAM 2. Then the spool file manager 304 instructs the de-spooler 305 to perform printing processing for the intermediate code written in the spool file 303.

The despoiler 305 processes the intermediate code included in the spool file 303 according to the content for process settings included in the spool file 303, and once more outputs via the graphics engine 202. In this event, the spool file manager 304 displays the printing progress situation.

Also, in the case that the printing command received from the graphics engine 202 is the printing command issued from the despoiler 305 to the graphics engine 202, the dispatcher 301 sends the printing command to the printer driver 203 instead of the spooler 302.

The printer driver 203 generates a printer control command and outputs this to the printer 1500 via the system spooler 204.

Note that the application 201 is running on the host computer 3000, and can send the print job to the printer 1500 using the printer driver 203. When transmitting a print job, the application 201 generates the host side print job data 400 such as that shown in FIG. 4 and saves this to the external memory 11.

Note that the process of generating the host side print job data 400 or saving this to the external memory 11 may be configured to be performed by the printer driver 203. Also, a configuration may be made such that means for monitoring the transmission of the print job to the printer 1500 is provided, and these means generate the host side job data 400 and saves this to the external memory 11. In other words, any means may be configured so long as it is the means of the host computer 3000 which saves the host side print job data 400 to the external memory 11.

Note that a configuration may be made wherein saving the host side print job data 400 to the external memory 11 is limited, based on the number of jobs held which is set beforehand in the external memory 11, open capacity of the external memory 11 and so forth. In other words, in the event that the job number in the host side print job data 400 held in the external memory 11 exceeds the number set beforehand (for example, 100 jobs), generating/saving processing of the host side print job data 400 is not executed. Also, in the event that the open capacity of the external memory 11 reaches within a threshold (for example, 10%) of a value set beforehand, generating/saving processing of the host side print job data 400 is not executed.

Also, the CPU 1 may be configured to delete any host side print job data 400 exceeding a time period (for example, 3 days) set beforehand from the external memory 11.

Figure 4:
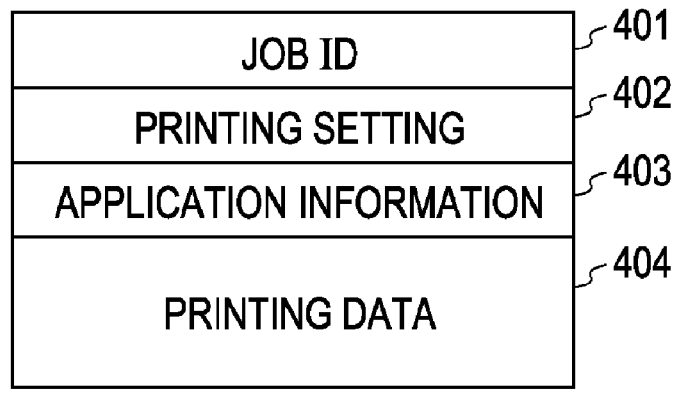
FIG. 4 is a data configuration diagram of an example of host side print job data according to the present embodiment.

FIG. 4 is a data configuration diagram showing an example of the host side print job data 400 according to the present embodiment.

As shown in FIG. 4, the host side print job data 400 includes printing settings 402, application information 403, printing data 404, and a job ID 401 as a key to uniquely specify the print job.

The job ID 401 shows the unique job ID given by the application 201 at the time of printing, and has a 1-to-1 relationship with the print job. With the printing data 404, in the event that data of the application 201 can be directly saved, the application 201 saves the application data saved immediately prior to printing as the printing data 404. On the other hand, in the event that the data of the application 201 cannot be directly saved, the data sent to the printer driver 203 is saved as the printing data 404.

Also, in the event that the printing data 404 is of a data format which can bundle the printing settings, the printing setting information is included in the printing data 404, and nothing is saved in the printing settings 402. On the other hand, in the event that the data format of the printing data 404 cannot bundle the printing settings, or if the printing data 404 is the data sent to the printer driver 203, the printing setting information at the time of printing is saved to the printing settings 402.

Information specifying the application having performed the printing is saved to the application information 403.

Also, the printer driver 203 transmits the printing data to the printer 1500 at time of printing with the job ID 401 corresponding to the print job attached thereto.

Also, a reprinting request monitoring unit 306 (FIG. 3) which receives instructions from the printing apparatus and operates accordingly is added to the host computer 3000. In an embodiment, the reprinting request monitoring unit 306 is realized by the CPU 1 of the host computer 3000 reading to the program RAM 2 stored on the external memory 11 and executing this. The reprinting request monitoring unit 306 has a function for monitoring a specified communication port of the host computer 3000. Then the reprinting request monitoring unit 306 executes the reprinting processing, shown in the flow in FIGS. 18 and 19 to be described later, with the host computer 3000, upon the reprinting request being received at the communication port being monitored.

Accordingly, in the event that the printer 1500 performs reprinting instructions, the instructions are made as to this communication port.

Note that in the event there is a printing setting file at a position determined in the external memory 11, the printing setting interface is initialized with the printing settings written in this printing setting file.

Figure 5:
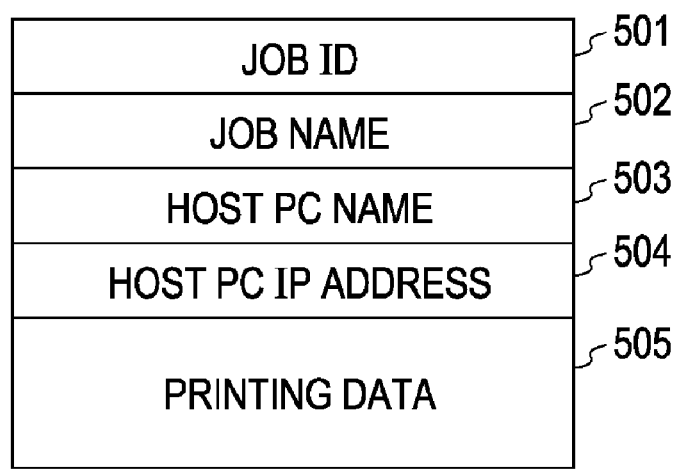
FIG. 5 is a data configuration diagram of an example of printing apparatus side print job data according to the present embodiment.

When the printing data is received from the host computer 3000, the CPU 12 of the printer 1500 executes printing processing, but in this event, printing apparatus side print job data 500 such as that shown in FIG. 5 is saved to the external memory 11.

In an embodiment, a configuration is made wherein the CPU 12 can limit saving the printing apparatus side print job data 500 to the external memory 14, based on the number of jobs held which is set beforehand in the external memory 14, open capacity of the external memory 11 and so forth. In other words, in the event that the number of jobs in the printing apparatus side print job data 500 held in the external memory 14 exceeds the number set beforehand (for example, 100 jobs), the CPU 12 does not execute generating/saving processing of the printing apparatus side print job data 500. Also, in the event that the open capacity of the external memory 14 reaches within a threshold (for example, 10%) of a value set beforehand, the CPU 12 does not execute generating/saving processing of the host side print job data 400.

Also, the CPU 12 may be configured to delete any printing apparatus side job data 500 exceeding a time period (for example, 3 days) set beforehand from the external memory 14.

FIG. 5 is a data configuration diagram showing an example of the printing apparatus side print job data 500 according to the present embodiment. As shown in FIG. 5, the printing apparatus side print job data 500 includes a job name 502, printing source host PC name 503, printing source host PC IP address 504, printing data 505, and a job ID 501 as a key to uniquely specify the print job.

The job ID 501 shows the unique job ID given at the time of printing, and has a 1-to-1 relationship with the print job (that is to say, the job ID 401 in FIG. 4).

Actions at the time of performing reprinting will be described below with reference to FIG. 3.

For reprinting, there are two types of methods, namely, a method for performing reprinting by using the printing data saved on the printer 1500 (that is to say, 404 in FIG. 4) and a method for performing reprinting by using the printing data saved on the host computer 3000 (that is to say, 505 in FIG. 5).

Reprinting processing when using printing data saved in the printer 1500 will be described.

In this event, first, the user uses the operating unit 1501 to select the job to be reprinted from a list of printer side print job data saved on the external memory 14, and instructs reprinting of the printing data saved in the printer 1500. Corresponding to this operation, the CPU 12 of the printer 1500 performs controls for reprinting, using the printing data associated with the above selected job.

Also, in this event, the user can change printing settings which are changeable with the operating 1501 as necessary. However, reprinting cannot be performed if the printing data does not exist in the printer side print job data.

Next, a case for executing reprinting using the printing data saved on the host computer 3000 will be described.

In this event also, similar to the above-described situation, the user uses the operating unit 1501 to select a printing data job to be reprinted which is saved on the host computer 3000 from a list of printer side print job data which is saved on the external memory 14, and instructs the reprinting thereof. Corresponding to this operation, the CPU 12 of the printer 1500 obtains the job name 502 of the above selected job, the printing source host PC name 503 serving as the printing source host computer information of the job to be reprinted, and the IP address 504 of the printing source host PC. Further, using the obtained information, the CPU 12 of the printer 1500 performs controls to transmit the reprinting instructions to which are attached the job ID 501 to a specified communication port from the printer 1500 to the host computer 3000.

On the other hand, the reprinting request monitoring unit 306 of the host computer 3000 having received the reprinting instructions uses the job ID attached to the received reprinting instructions, and obtains host side print job data having a matching job ID from the external memory 11. Then, the reprinting request monitoring unit 306 obtains printing data 404 from the obtained host side print job data, and if necessary, obtains the printing application information 403 and the printing setting information 402. In the event that the obtained printing data 404 is application data, the reprinting request monitoring unit 306 performs controls to create a state of the first printing by opening the printing data with the application shown in the printing application information 403.

Note that, in an embodiment, in the event the data format cannot save the printing settings to the printing data 404, the reprinting request monitoring unit 306 performs controls to dispose the information of the printing setting information 402 as a file to a specified position on the external memory 11. Thus, when the application 201 uses the printer drive 203 to reprint, the user can perform reprinting by using the interface on the printer driver 203 wherein printing settings at the time of the first printing has been performed.

Also, in the event that the printing data 404 is data which is sent to the printer driver 203, reprinting can be performed by the reprinting request monitoring unit 306 displaying the job list having received the reprinting request, and enabling printing of the selected job. At this time, the reprinting request monitoring unit 306 can dispose the information of the printing setting information 402 as a file to a specified position on the external memory 11, thus enabling the settings of the printer driver 203 to be in the same state as immediately prior to performing the previous printing. Also, when reprinting, the user can change the printing settings by being able to open the interface of the printer driver 203.

Next, the configuration of the operating unit 1501 of the printer 1500 shown in FIG. 1 will be described in detail with reference to FIG. 6.

Figure 6:
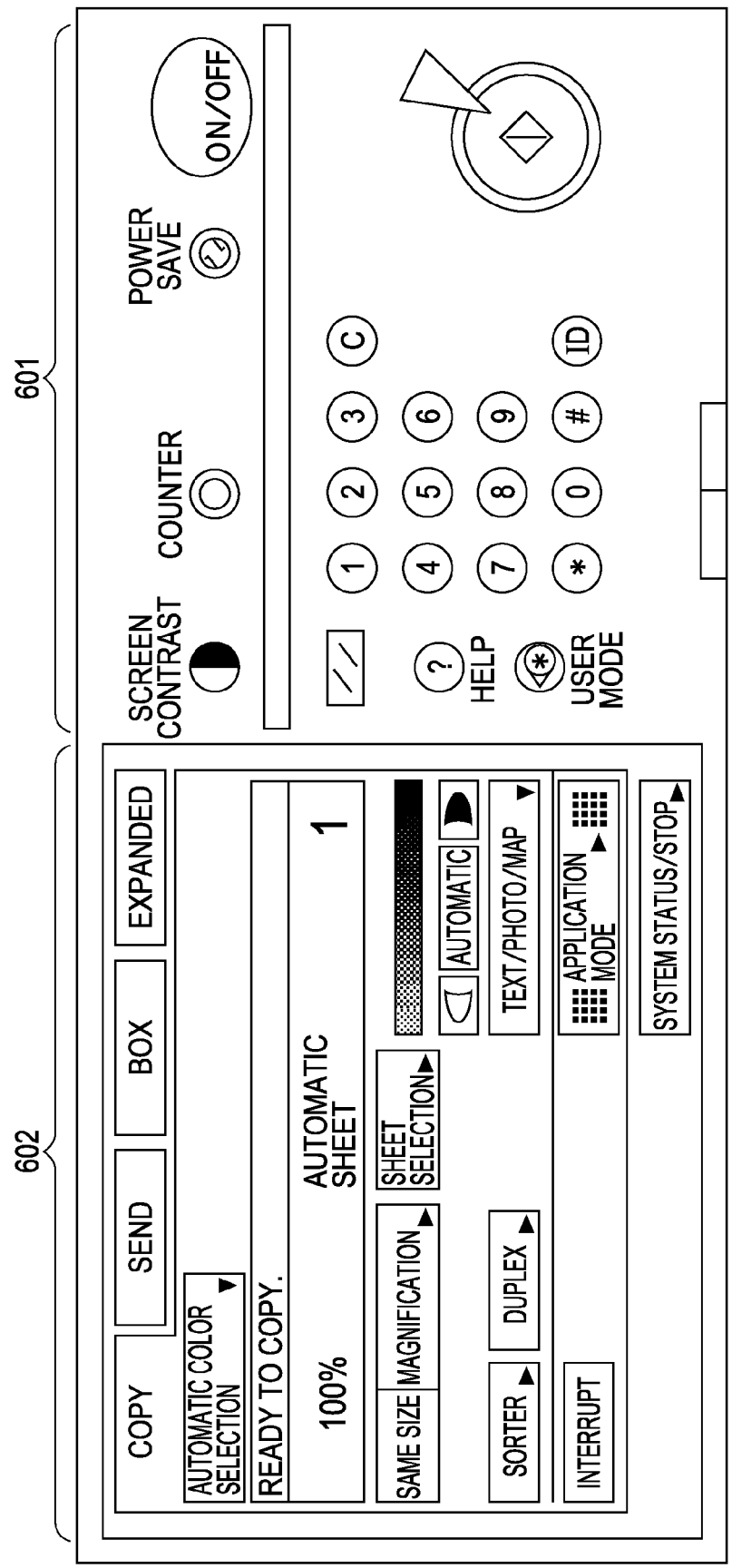
FIG. 6 is a model diagram of an example of an operating unit of the printer shown in FIG. 1.

FIG. 6 is a model diagram of an example of the operating unit 1501 of the printer 1500 shown in FIG. 1. Note that a case wherein the printer 1500 is an MFP is shown here.

As shown in FIG. 6, the operating unit 1501 is made up of a key input unit 601 and a touch panel portion 602. Each of these is shown in detail in FIG. 7 and FIG. 8, respectively, and each will be described in detail below.

Figure 7:
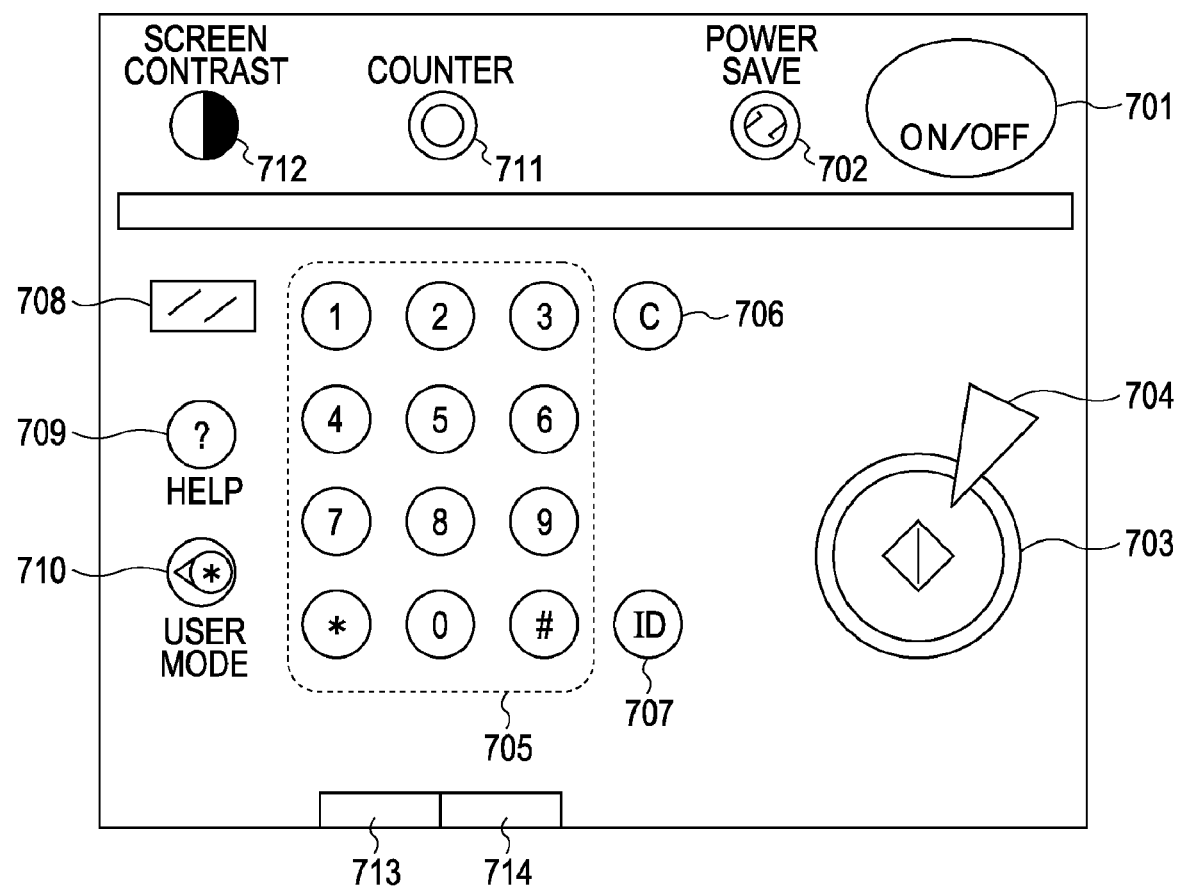
FIG. 7 is a model diagram of an example of a key input unit shown in FIG. 6.

First, the key input unit 601 will be described with reference to FIG. 7. FIG. 7 is a model diagram of an example of the key input unit 601 shown in FIG. 6.

As shown in FIG. 7, the key input unit 601 has multiple hard keys. An operating unit power switch 701 is for switching between a standby mode (normal action state) and sleep mode, and can be controlled with the main power switch turned ON which performs power supply for the entire system. Note that the sleep mode indicates a state wherein the main controller (CPU 12) stops the program in an interruption standby state for network printing or facsimile and so forth, thereby suppressing power consumption.

The power save key 702 is a key which lowers the control temperature of a fixed device at the time of standby mode, and necessitates time until the device is in a printable state, but enables suppression of power consumption. The control temperature can also be lowered by setting the rate of power savings.

A start key 703 is a key for instructing the start of copying or transmitting. A stop key 704 is for stopping the copying or transmitting.

A numeric keypad 705 is for performing numeric input for various types of settings. A clear key 706 is a key for clearing the numeric input. An ID key 707 is a key for entering a previously set code number for confirming the operator of the MFP.

A reset key 708 is a key for invalidating the various settings and for returning the device to the default state. A help key 709 is a key for displaying guidance or help. A user mode key 710 is a key for moving to a system setting screen for each user.

A counter confirmation key 711 is a key for displaying the number of sheets which have been output, which is stored in a software counter provided within the MFP for counting printing sheets and so forth. By pressing this key 711, the number of output sheets can be displayed on the touch panel portion 602, corresponding to each from action modes such as copy/print/scan/fax and so forth, color mode such as color/monochrome, and paper size such as large/small.

An image contrast dial 712 is a dial for adjusting the ease of viewing the screen, but adjusting the light of the backlighting on the liquid crystal display of the touch panel portion 602.

An execution/memory lamp 713 is a lamp which flashes as notification during execution of a job or access to memory. An error lamp 714 is a lamp which flashes as notification in the case of errors wherein a job cannot be executed or a service person must be called, or wherein an operator must be called to correct a paper jam or replenish supplies.

Figure 8:
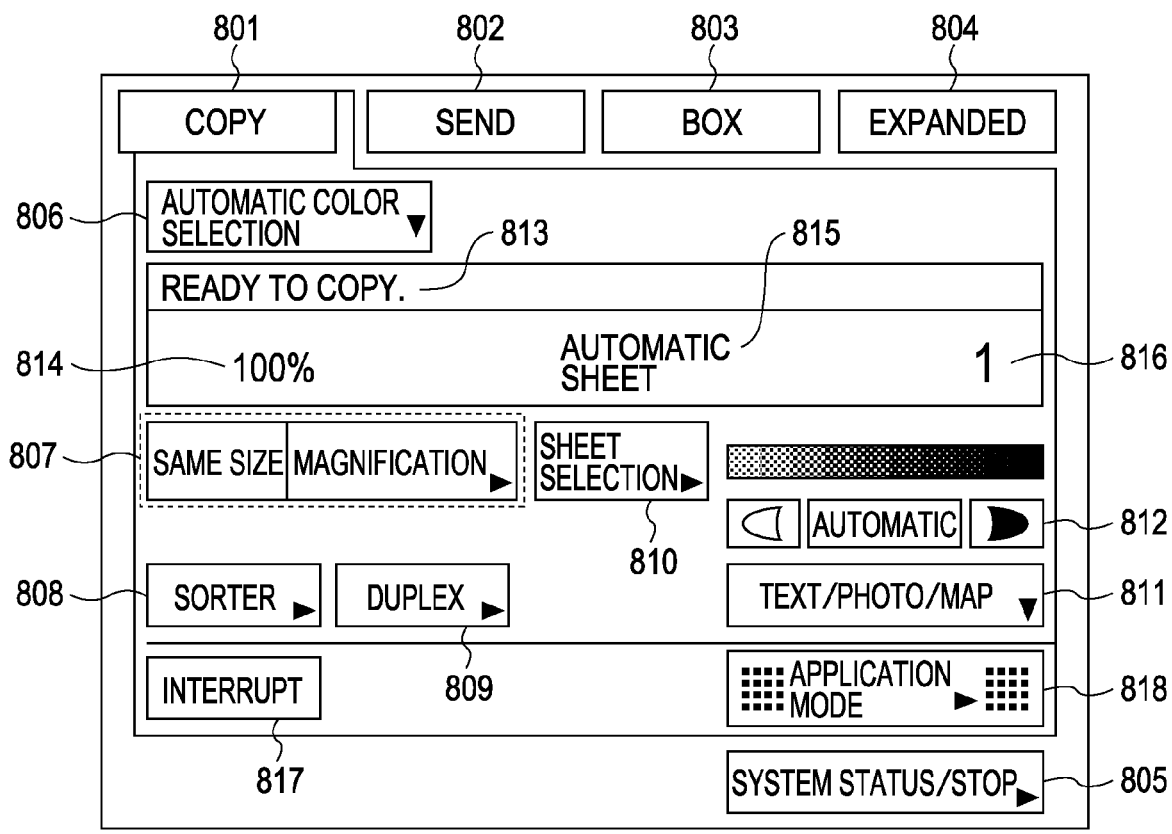
FIG. 8 is a model diagram of an example of a touch panel portion shown in FIG. 6.

Next, the touch panel portion 602 will be described with reference to FIG. 8. FIG. 8 is a model diagram of an example of the touch panel portion 602 shown in FIG. 6.

With the present embodiment, the touch panel portion 602 is configured with an LCD (Liquid Crystal Display) and a touch panel display formed from a transparent electrode affixed on top thereof. Controls are programmed beforehand to detect when a portion of the transparent electrode equivalent to the key displayed on the LCD is touched with a finger, and to display a separate operating screen and so forth. This diagram is an initial screen for standby mode, and can display various operating screens according to the setting operations.

A copy tab 801 is a tab key for transitioning to an operating screen for copying action. A sending tab 802 is a tab key for transitioning to an operating screen which instructs sending action such as sending a fax or email. A box tab 803 is a tab key for transitioning to a screen for input/output operations of jobs to a box (storing means for storing jobs for each user). An option tab 804 is a tab key for setting expansion functions such as scanner settings. By the user selecting (touching) these tabs 801 through 804, transition can be made to each operating mode.

A system monitor key 805 is a key for displaying the status or situation of the MFP. By the user selecting (touching) this system monitor key 805, transition can be made to a screen displaying the status or situation of the MFP (for example, the screen shown in FIG. 9).

A color selection setting key 806 is a key for selecting in advance for color copies, black and white copies, or automatic selection. A magnification setting key 807 is a key for transitioning to a screen to perform magnification settings such as same size, enlarging, or shrinking. A post-processing setting key 808 is a key for transitioning to a screen for selecting whether or not to use staples or hole-punching, and the number and position and so forth thereof. A duplex setting key 809 is a key for transitioning to a screen for setting whether to use simplex printing or duplex printing. A paper size selecting key 810 is a key for transitioning to a screen for selecting paper supply level, paper size, and media type. An image mode setting key 811 is a key for selecting the image mode applicable to the manuscript image such as text mode or photograph mode. A density setting key 812 is a key for adjusting the output image to be darker or lighter. By the user selecting (touching) these various keys 806 through 812, the respective settings can be performed.

Next, a status display unit 813 is a display unit for performing simple status displays such as standby state, warming up, paper jams, errors, and so forth. A magnification display portion 814 is a display portion for displaying the magnification set with the magnification setting key 807. A paper size display portion 815 is a display portion for displaying the paper size or mode set with the paper size setting key 810. A sheet count display portion 816 is a display portion for displaying the number of sheet specified with the numeric keypad 705, or displaying which sheet is being printing during operation.

Further, an interrupt key 817 is a key to be used in the event of interrupting with another job during copying, and by the user selecting (touching) this key, another job can interrupt the job currently copying.

An application mode key 818 is a key for transitioning to a screen for performing settings such as various image processing or layouts, such as continuous pages, cover sheet and facing sheets, reduced layouts, image moving, and so forth. By the user selecting (touching) this key, transition can be made to a setting screen for application mode.

Figure 9:
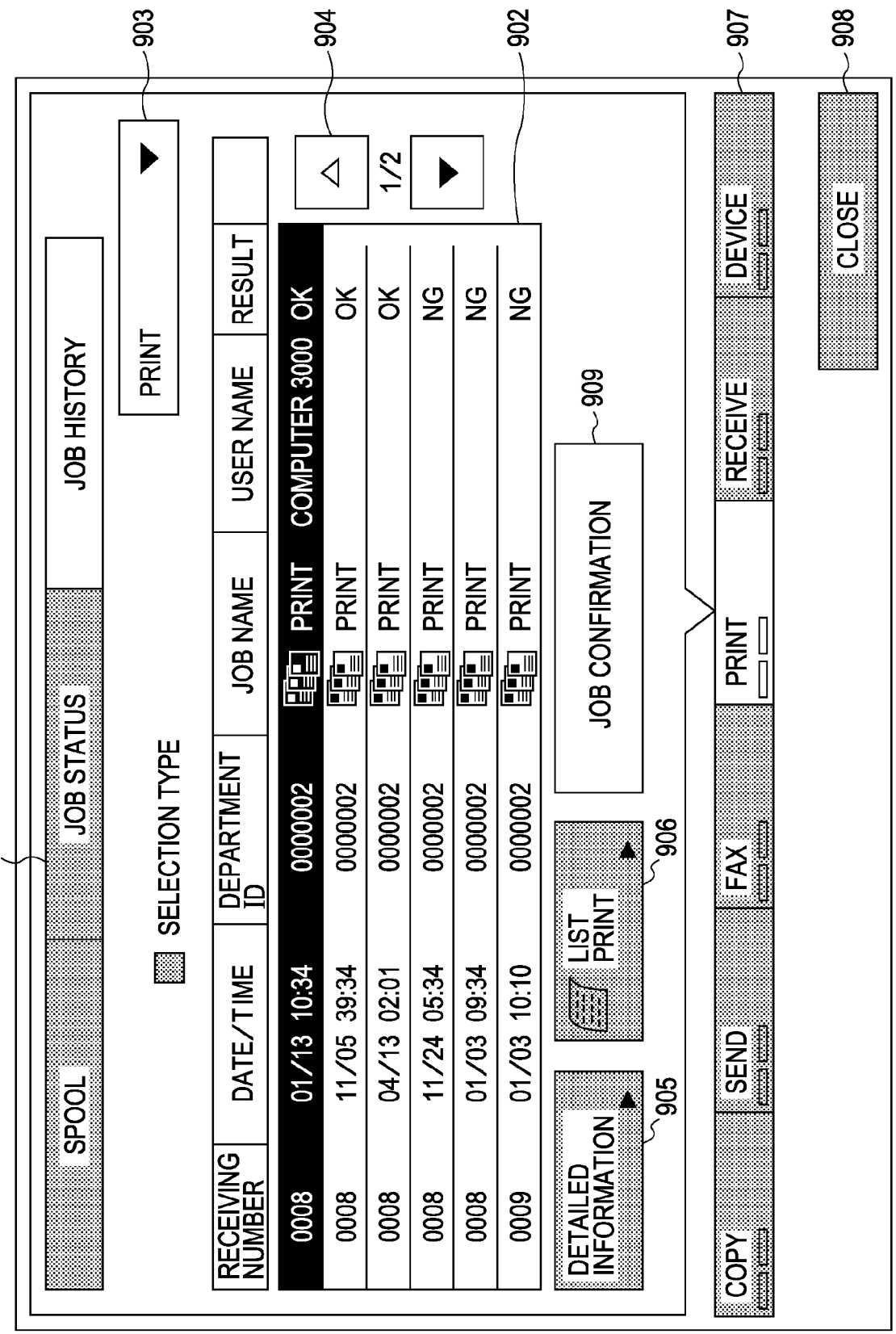
FIG. 9 is a model diagram of an example of an operating screen for operating job history.

FIG. 9 is a model diagram of an example of an operating screen for operating job history. This screen is displayed on the touch panel portion 602 in the event that the system monitor key 805 shown in FIG. 8 is selected, and shows job history and enables the user to perform operations relating to a job in the history.

A job display switchover button is a button for switching between operating screens relating to the job. By the user selecting (touching) this key, the user can freely switch between "spool" to display the spooled job, "job status" to display the status of a job, and "job history" to display the history of a job.

A job history display portion 902 is a portion for displaying the history of a job, and displays the receiving number of a job, processing date/time, department ID, job name, user name, printing results, and so forth. Note that by the user touching the job history within the job history display portion 902, this job can be selected.

A selection type key 903 is a button for selecting and displaying the various types of job input in the MFP (for example, copying, printing, faxing, scanning, and so forth). The types of job history selected with the selection type key 903 are displayed on the job history display portion 902.

A scroll button 904 enables the job history display portion 902 to be scrolled when the job history display portion 902 has multiple lines and will not all fit into the screen. A detailed display button 905 can display detailed information of the job selected with the job history display portion 902. A list print button 906 can print the job history displayed on the job history display portion 902.

A mode switchover key 907 can switch to other function setting screens such as copying or faxing. An end key 908 ends the job history display and can return to the screen shown in FIG. 8. By the user selecting (touching) these keys or buttons 903 through 908, processing can be executed corresponding to each key.

With the present embodiment, a job confirming function is added to the normal job history display, and is configured such that a job confirming button 909 is added to enable reprinting.

This job confirming button 909 can also be used in the event that a job selected with the job history display portion 902 needs to be deleted.

Figure 10:
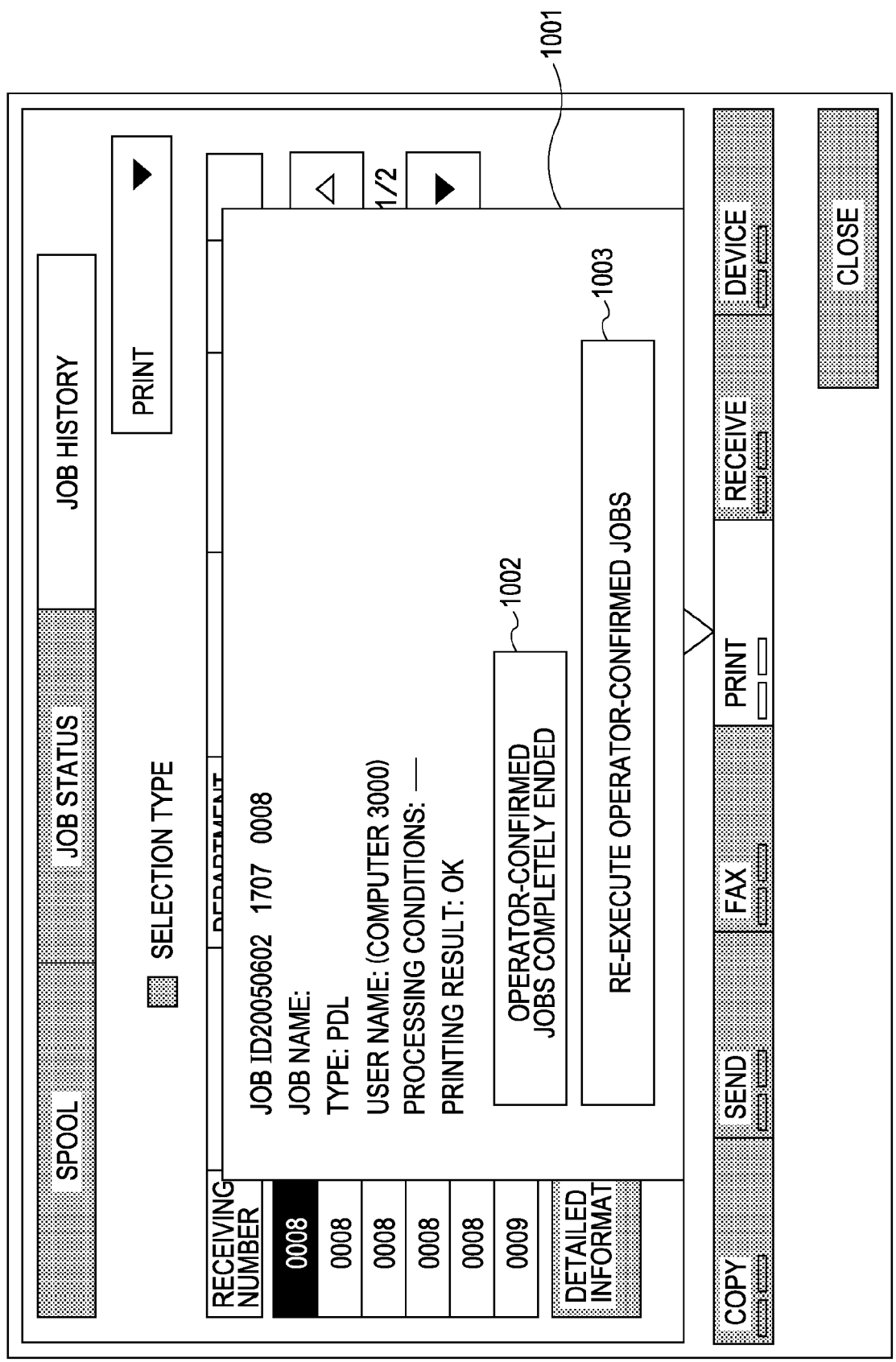
FIG. 10 is a model diagram of an example of a dialog box for selecting deleting or reprinting of a job of which the history is managed.

When the job confirming button 909 is selected (touched), a dialog box 1001 is displayed as shown in FIG. 10, and a selection can be whether to delete the selected job from history or whether to perform reprinting.

Next, an embodiment of the present invention according to the above-described system will be described.

Note that an embodiment of the present invention enables reprinting from a user interface on the printing apparatus. In order to perform this reprinting, according to an embodiment of the present invention, job information and printing data can be saved in the memory portion of the printing apparatus.

With the present embodiment, the system is configured so that the job information and printing data (that is to say, the printing apparatus side print job data in FIG. 5) can be saved in the external memory 14 of the printer 1500 shown in FIG. 1. Also, the system is configured so that a function (reprinting request monitoring unit 306 shown in FIG. 3) for receiving instructions from the printer 1500 and operating accordingly is added to the host computer 3000.

Additionally, the host computer 3000 is configured to save the information specifying the printing data (job ID 401) and the printing data 404 (that is to say, the host side print job data in FIG. 4) in the external memory 11 at the time of printing. With this configuration, in the event of a reprinting request from the printer 1500, reprinting can be performed by using the information saved in the external memory 11 (the host side print job data in FIG. 4).

In an embodiment, the above reprinting processing is performed according to the flow described later in FIGS. 16 through 19.

Next, the procedure for reprinting will be described with reference to the user interface shown in FIGS. 9 through 15.

First, the user selects the job to be reprinted from the user interface (the job history display portion 902 in FIG. 9) on the printer 1500. With the present embodiment, the system is configured to add a job confirming button 909 to the printing history display portion shown in FIG. 9 to perform reprinting.

Note that this job confirming button 909 can also be used when needing to delete a job selected with the job history display portion 902 from history.

When the user selects (touches) the job confirming button 909, the CPU 12 of the printer 1500 displays the dialog box 1001 as shown in FIG. 10 on the touch panel portion 602 so the user can select whether to delete the job from history or to perform reprinting.

FIG. 10 is a model diagram of an example of a dialog box for selecting deleting or reprinting of a job of which the history is managed.

With the screen in FIG. 10, the user can display detailed information about the job selected with the job history display portion, and can select whether to completely delete the job from the job history or to reprint the job.

Figure 11:
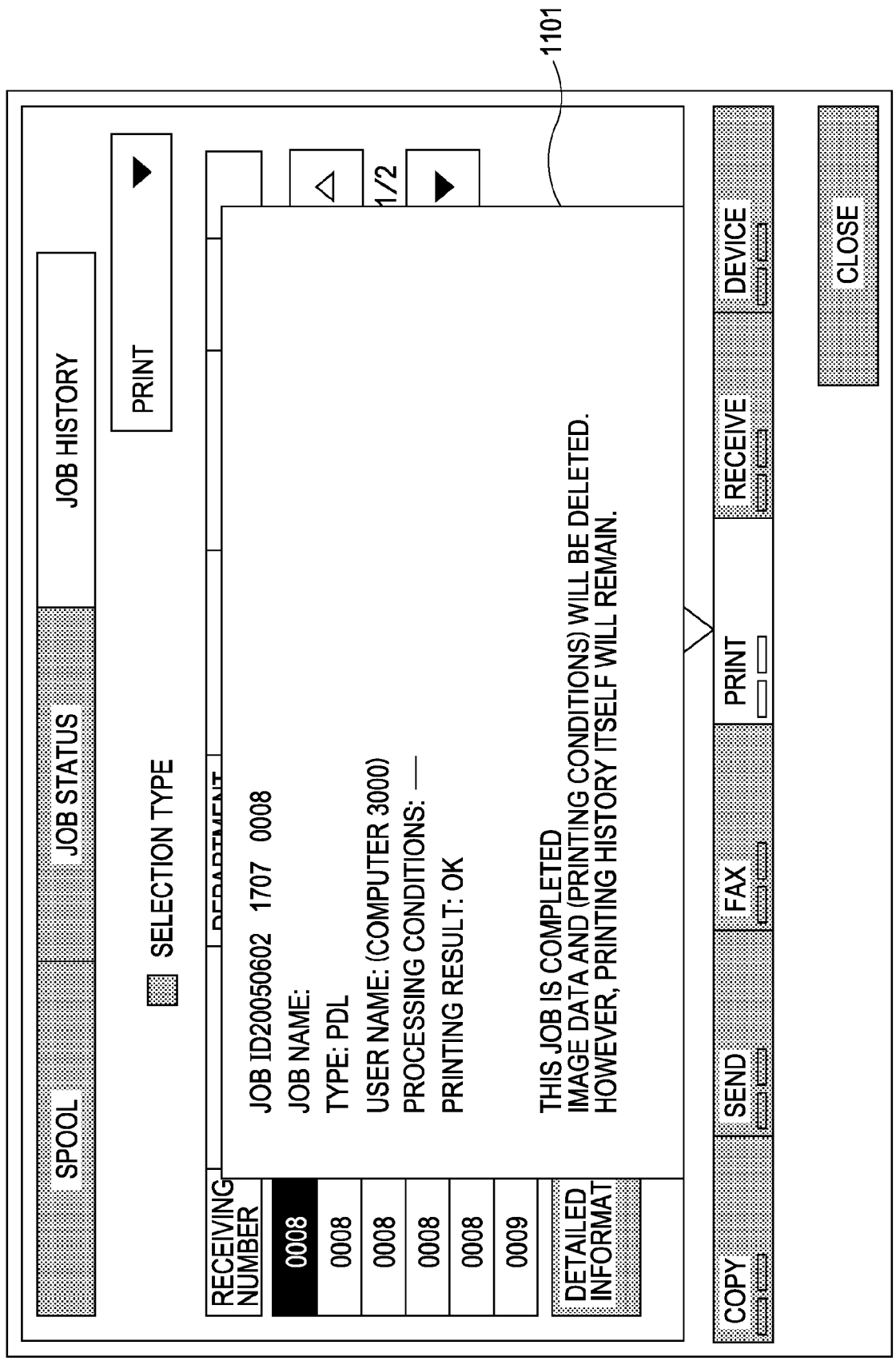
FIG. 11 is a model diagram of an example of a dialog box displayed in the case that deleting is specified for a job of which the history is managed.

When the user instructs (touches) an "operator-confirmed jobs completely ended" button 1002, the CPU 12 of the printer 1500 transitions the screen on the touch panel portion 602 to a dialog box 1101 such as that shown in FIG. 11. Further, the CPU 12 of the printer 1500 controls the information of the selected job (the printing apparatus side print job data in FIG. 5) to be deleted from the external memory 14.

FIG. 11 is a model diagram of an example of a dialog box displayed in the case that deleting is specified for a job of which the history is managed.

Figure 12:
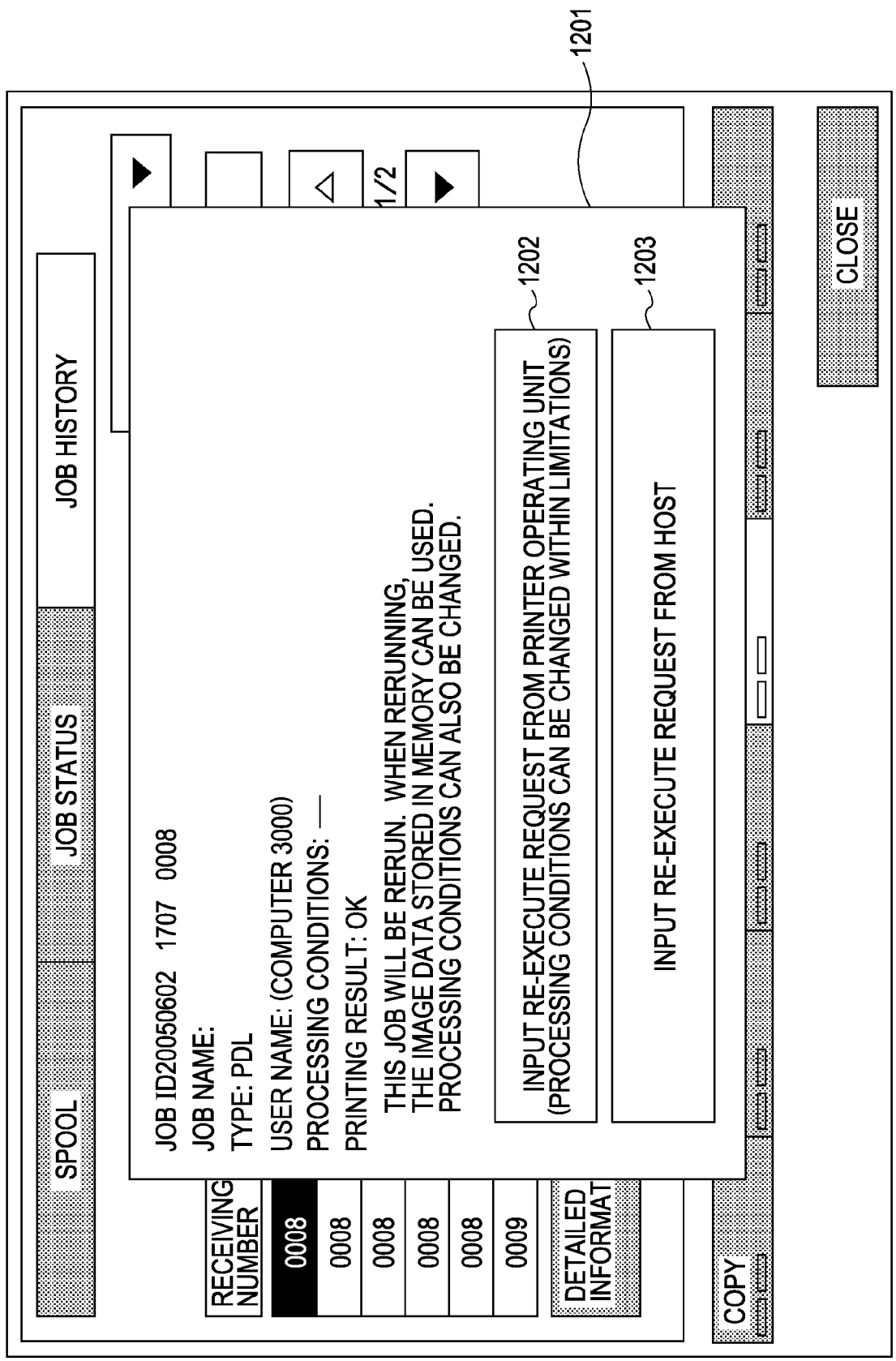
FIG. 12 is a model diagram of an example of a dialog box displayed in the case that reprinting is specified for a job of which the history is managed.

On the other hand, if the user instructs (touches) a "re-execute operator-confirmed jobs" button 1003, the CPU 12 of the printer 1500 transitions the screen on the touch panel portion 602 to a dialog box 1201 such as that shown in FIG. 12.

FIG. 12 is a model diagram of an example of a dialog box displayed in the case that reprinting is specified for a job of which the history is managed.

With the screen in FIG. 12, the user selects whether to user the data within the printing apparatus to perform reprinting or whether to perform reprinting from the printing source host.

Figure 13:
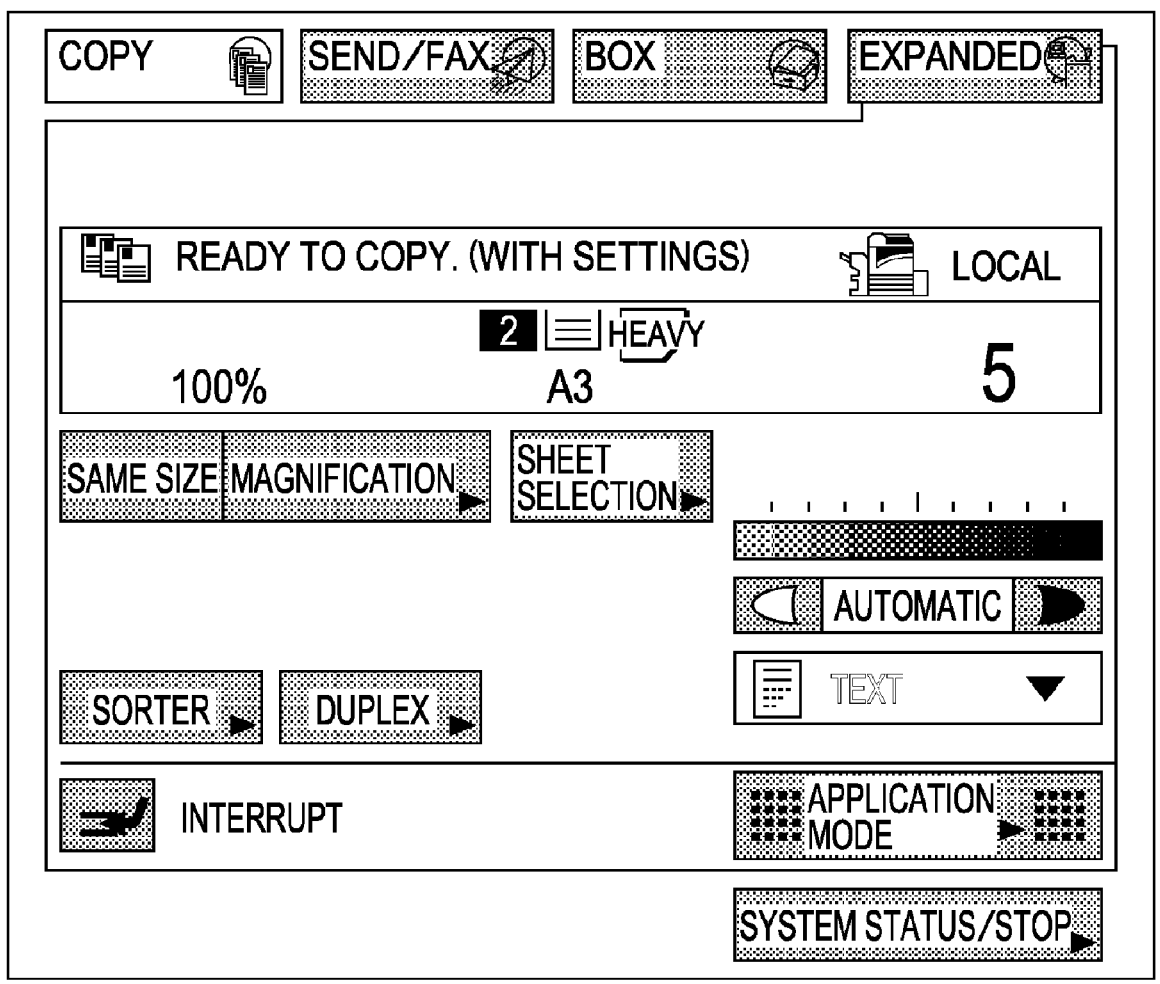
FIG. 13 is a model diagram of an example of a screen for performing printing setting in the case that a re-execution request is input from the operating unit of the printer.

When the user instructs (touches) an "input re-execute request from printer operating unit" button 1202 on this screen, the CPU 12 of the printer 1500 transitions the screen on the touch panel 602 to the screen such as that shown in FIG. 13. If the user desired a different printing setting, reprinting can be executed by performing setting changes from the screen in FIG. 13.

FIG. 13 is a model diagram of an example of a screen for performing printing setting in the case that a re-execution request is input from the operating unit of the printer.

On the other hand, if the user instructs (touches) an "input re-execute request from host" button 1203 on the dialog box 1201 in FIG. 12, the CPU 12 of the printer 1500 performs controls as follows. The CPU 12 specifies the printing source host from the information of the job to be reprinted (the job selected in 902 in FIG. 9), and sends reprinting instructions with the job ID attached thereto to the printing source host computer. This processing within the printing apparatus is performed according to the flow shown in FIGS. 18 and 19.

Next the reprinting procedures with the host computer 3000 will be described.

Figure 14:
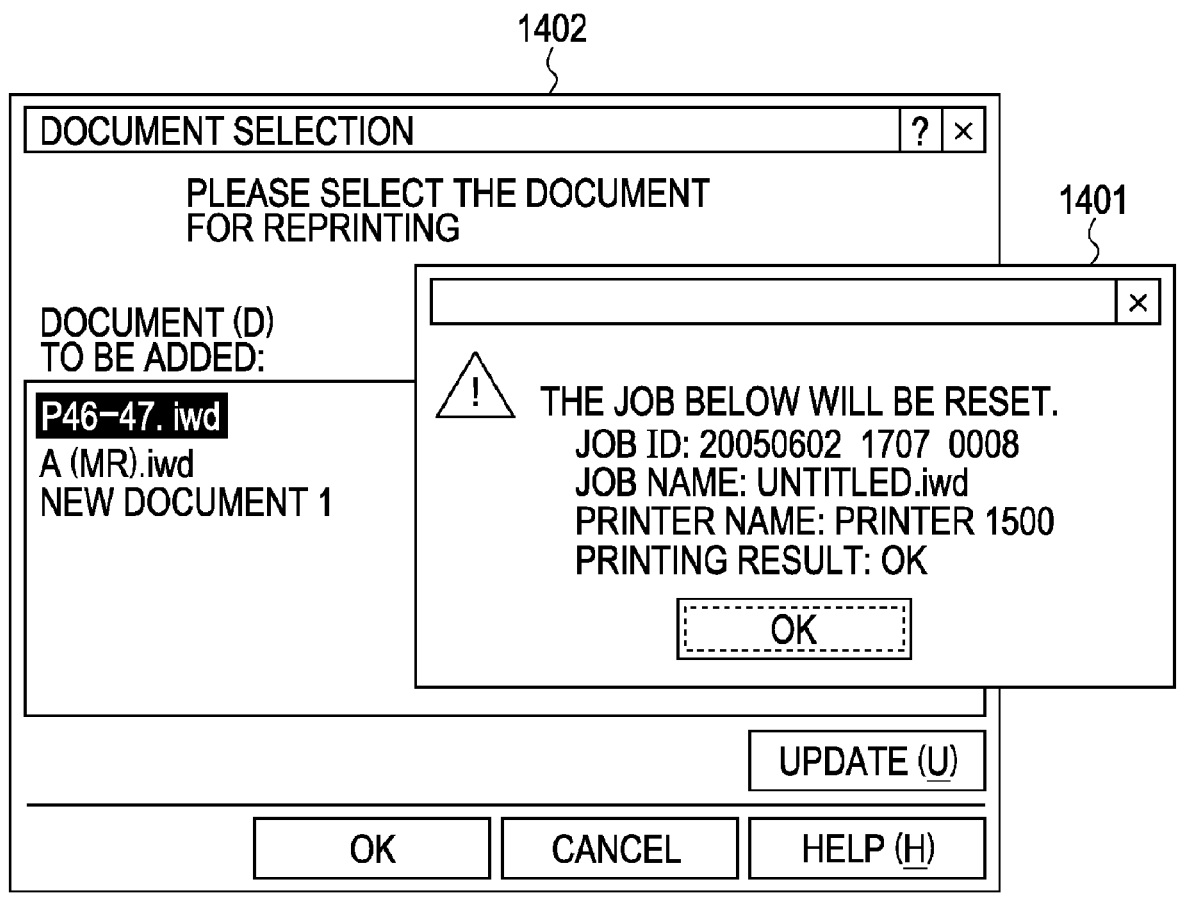
FIG. 14 is a model diagram of an example of a dialog box displayed on the CRT of the host computer in the case that the host computer receives reprinting instructions from the printer.

With the host computer 3000, the reprinting request monitoring unit 306 performs processing to receive instructions, and when reprinting instructions are received, the reprinting request monitoring unit 306 displays a dialog box such as that shown in 1401 of FIG. 14 to notify the user that reprinting instructions have been received.

FIG. 14 is a model diagram of an example of a dialog box displayed on the CRT 10 of the host computer 3000 in the case that the host computer 3000 receives reprinting instructions from the printer 1500.

As described above, with the host computer 3000, when reprinting instructions are received, the reprinting request monitoring unit 306 displays a dialog box such as that shown with 1401 on the CRT 10, to notify the user that reprinting instructions have been received. When the "OK" button on this dialog box 1401 is clicked with a pointing device and so forth, the dialog box is closed.

Further, when the reprinting request monitoring unit 306 receives reprinting instructions from the printer 1500, in the event that multiple reprinting instructions are received, a reprinting instruction list 1402 is displayed on the CRT 10, for the user to select the reprinting instructions for performing reprinting (the corresponding document). The user selects the reprinting instructions for performing reprinting (the corresponding document) with a pointing device or a keyboard 9.

On the other hand, if other reprinting instructions are not received, the reprinting request monitoring unit 306 the reprinting instruction thereof becomes the object of reprinting.

Then when the reprinting request monitoring unit 306 has specified the reprinting instructions for performing reprinting, the job ID attached to the reprinting instructions is obtained, and the printing data 404 and printing settings 402 are obtained from the corresponding job ID.

Note that, in an embodiment, if there is no printing data 404 corresponding to the above job ID in the external memory 11, reprinting cannot be performed.

Figure 15:
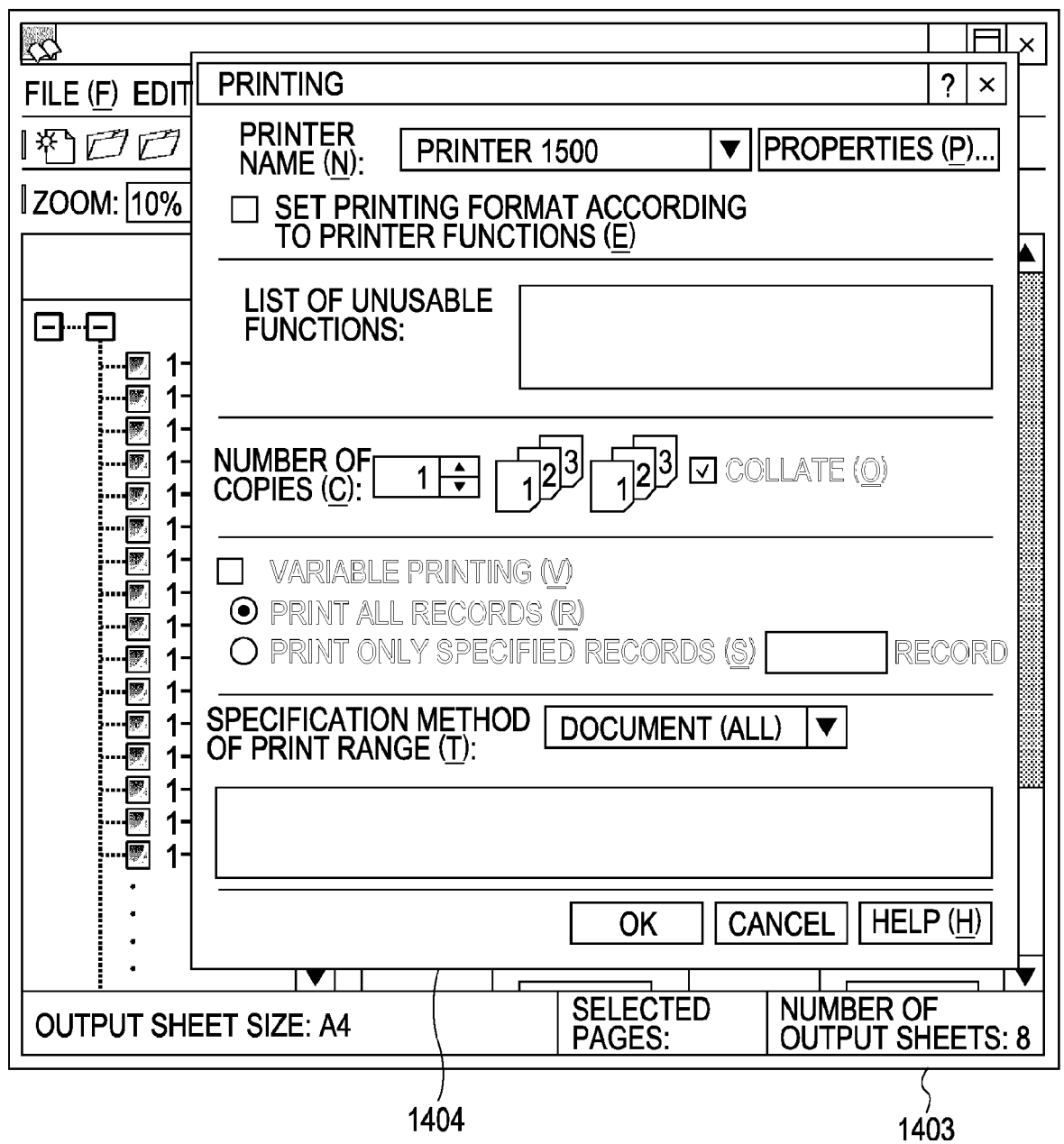
FIG. 15 is a model diagram of the state of the reprinting request monitoring unit having started up to the point of the screen directly prior to printing, due to a reprinting instruction.

If the printing data and printing settings for performing reprinting are obtained, the reprinting request monitoring unit 306 starts the printing application 201 corresponding to the above obtained printing data 404 as shown with 1403 in FIG. 15. Then the reprinting request monitoring unit 306 transfers the printing settings 402 to the application 201, and as shown with 1404 in FIG. 15, the printing dialog box is displayed, and the printing control means (201 through 204, 301 through 305 and so forth in FIG. 3) are set to the status thereof immediately prior to printing (immediately prior to print job generating).

Note that, in an embodiment, if the application 201 cannot receive printing settings 402, the reprinting request monitoring unit 306 can also transfer the printing settings 402 to the printer driver 203.

FIG. 15 a model diagram of the state of the reprinting request monitoring unit 306 having started up to the point of the screen directly prior to printing, due to a reprinting instruction.

If printing is instructed in this state with the printing dialog box 1404 and by performing necessary settings (with the UI of the printer driver 203 which is started with a property button), the job selected with the printer 1500 can be reprinted.

Note that with the present embodiment, an application corresponding to the jobs to be reprinted is started, but the process may be limited to notifying an application corresponding to the jobs to be reprinted.

Also, in the event there is an application on the host computer 3000 to manage the printing, the fact that reprinting instructions have been received is notified to the application managing the printing. Also, the application managing the printing may be configured so as to display status such as receiving reprinting on the host side job history list.

The above-described processing will be described below with reference to the flowcharts in FIGS. 16 through 19.

First, the processing on the printer 1500 side will be described with reference to FIGS. 16 and 17.

Figure 16:
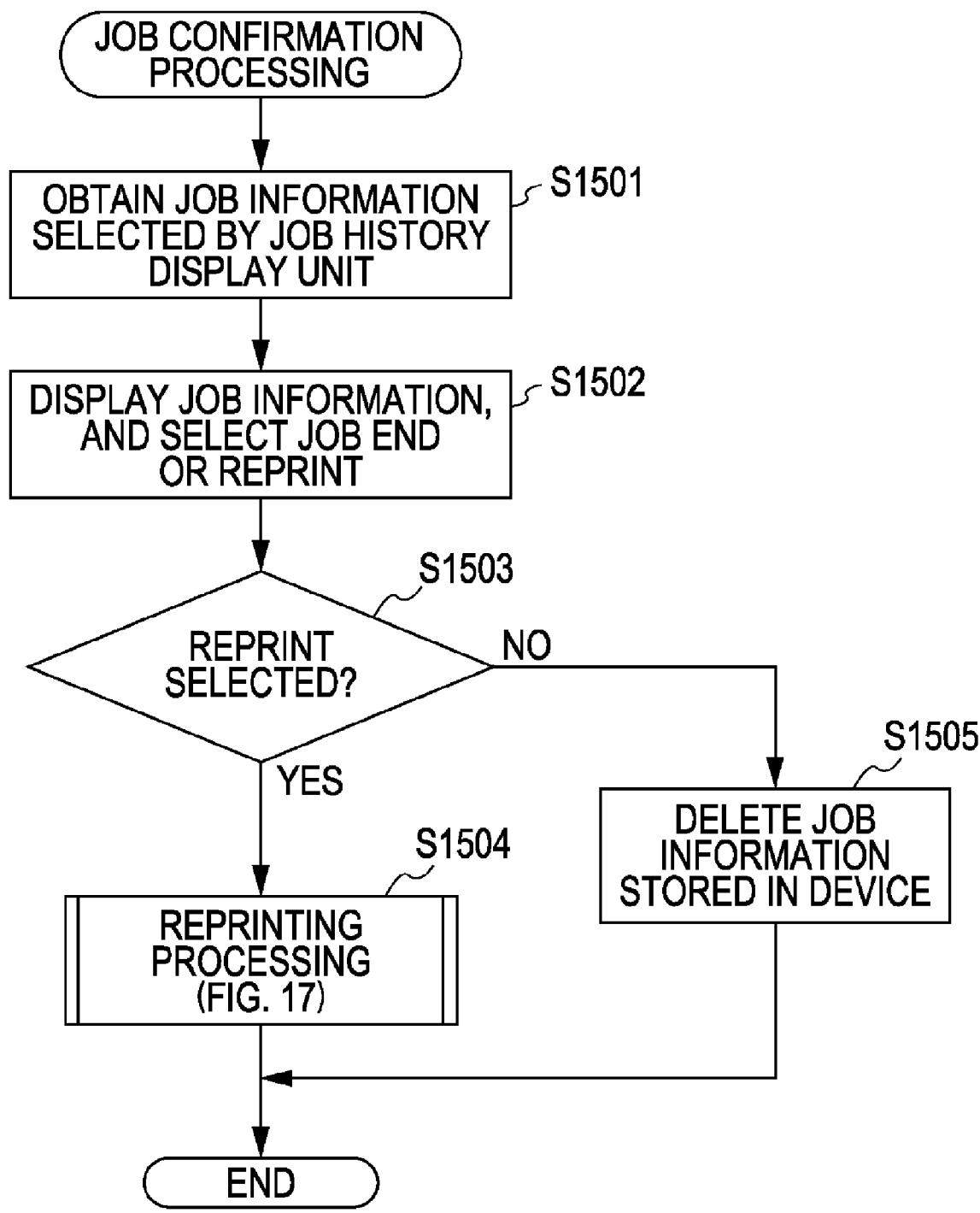
FIG. 16 is a flowchart showing an example of a first control processing sequence relating to the first embodiment.

FIG. 16 is a flowchart showing an example of a first control processing sequence according to the present invention, and corresponds to a processing sequence when the job confirming button 909 is pressed (touched) on the screen shown in FIG. 9. Note that, in an embodiment, the processing in this flowchart is realized by the CPU 12 of the printer 1500 reading a program stored in the ROM 13 and executing this. Also, the reference numerals S1501 through S1505 in the diagram represent each of the steps.

First, in step S1501, when the job confirming button 909 is pressed, the CPU 12 obtains the job selected with the job history display portion 902 and obtains the detailed job information from the external memory 14.

Next, in step S1502, the CPU 12 displays the dialog box 1001 (FIG. 10) which displays the detailed job information on the touch panel portion 602, enabling selection of whether to completely end the job or to perform reprinting. Then when the CPU 12 detects that either the "jobs completely ended" button 1002 or the "re-executing printing of operator-confirmed jobs" button 1003 is selected, the flow proceeds to step S1503.

In step S1503, the CPU 12 determines whether or not the "re-executing printing of operator-confirmed jobs" button 1003 is selected. Then if it is determined that the "re-executing printing of operator-confirmed jobs" button 1003 is selected (YES in step S1503), the flow proceeds to step S1504.

On the other hand, if the CPU 12 in step S1503 determines that "jobs completely ended" button 1002 is selected (NO in step S1503), the flow proceeds to step S1505.

In step S1505, the CPU 12 displays the dialog box 1101 shown in FIG. 11 on the touch panel portion 602, completely deletes the job information selected with the job history display portion 902 from the printing apparatus inner portion (the external memory 14), and ends the processing of the present flowchart.

In step S1504, the CPU 12 executes processing for reprinting (reprinting processing) (FIG. 17) and ends the processing of the present flowchart.

Figure 17:
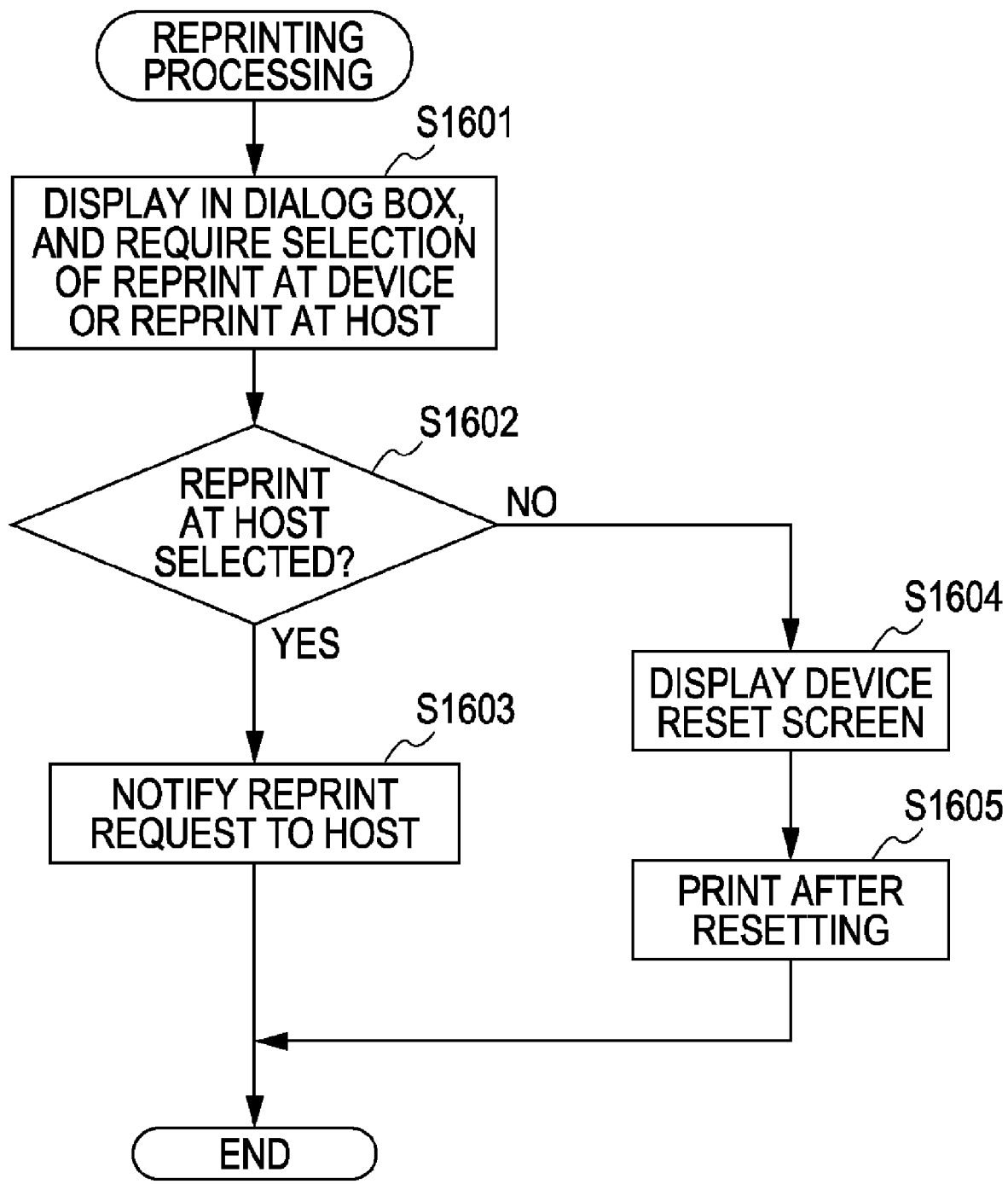
FIG. 17 is a flowchart showing an example of a second control processing sequence relating to the first embodiment.

FIG. 17 is a flowchart showing an example of a second control processing sequence according to the present invention, and corresponds to the reprinting processing sequence shown in step S1504 in FIG. 16. Note that, in an embodiment, the processing in this flowchart is realized by the CPU 12 of the printer 1500 reading a program stored in the ROM 13 and executing this. Also, the reference numerals S1601 through S1604 in the diagram represent each of the steps.

First, in step S1601, the CPU 12 displays the dialog box 1201 shown in FIG. 12 on the touch panel portion 602, enabling selection of whether to perform reprinting by performing setting at the printing apparatus or whether to perform reprinting at the printing source host. Then when the CPU 12 detects that either an "input re-execute request from printer operating unit" button 1202 or "input re-execute request from host" button 1203 is selected, the flow proceeds to step S1602.

In step S1602, the CPU 12 determines whether or not the "input re-execute request from host" button 1203 has been selected. Then in the event it is determined that the "input re-execute request from host" button 1203 is selected (YES in step S1602), the flow is advanced for step S1603.

On the other hand, if the CPU 12 determines in step S1503 that the "input re-execute request from printer operating unit" button 1202 has been selected (NO in step S1602), the flow proceeds to step S1604.

In step S1604, the CPU 12 displays the setting screen (FIG. 13) of the printer 1500 for the user to perform printing setting for the reprinting.

Next, in step S1605, the CPU 12 uses the printing settings which are set in step S1604 to execute the reprinting processing, and ends the processing of the present flowchart.

In step S1603, the CPU 12 obtains printing source host information (IP address and so forth) from the detailed job information and the job ID in order to perform reprinting at the printing source host. Further, the CPU 12 sends a reprinting notification attached with a job ID to the host computer 3000 specified with the obtained host information. The processing of this flowchart is then ended.

Next, the processing on the computer 3000 side will be described with reference to the flowchart in FIGS. 18 and 19.

Figure 18:
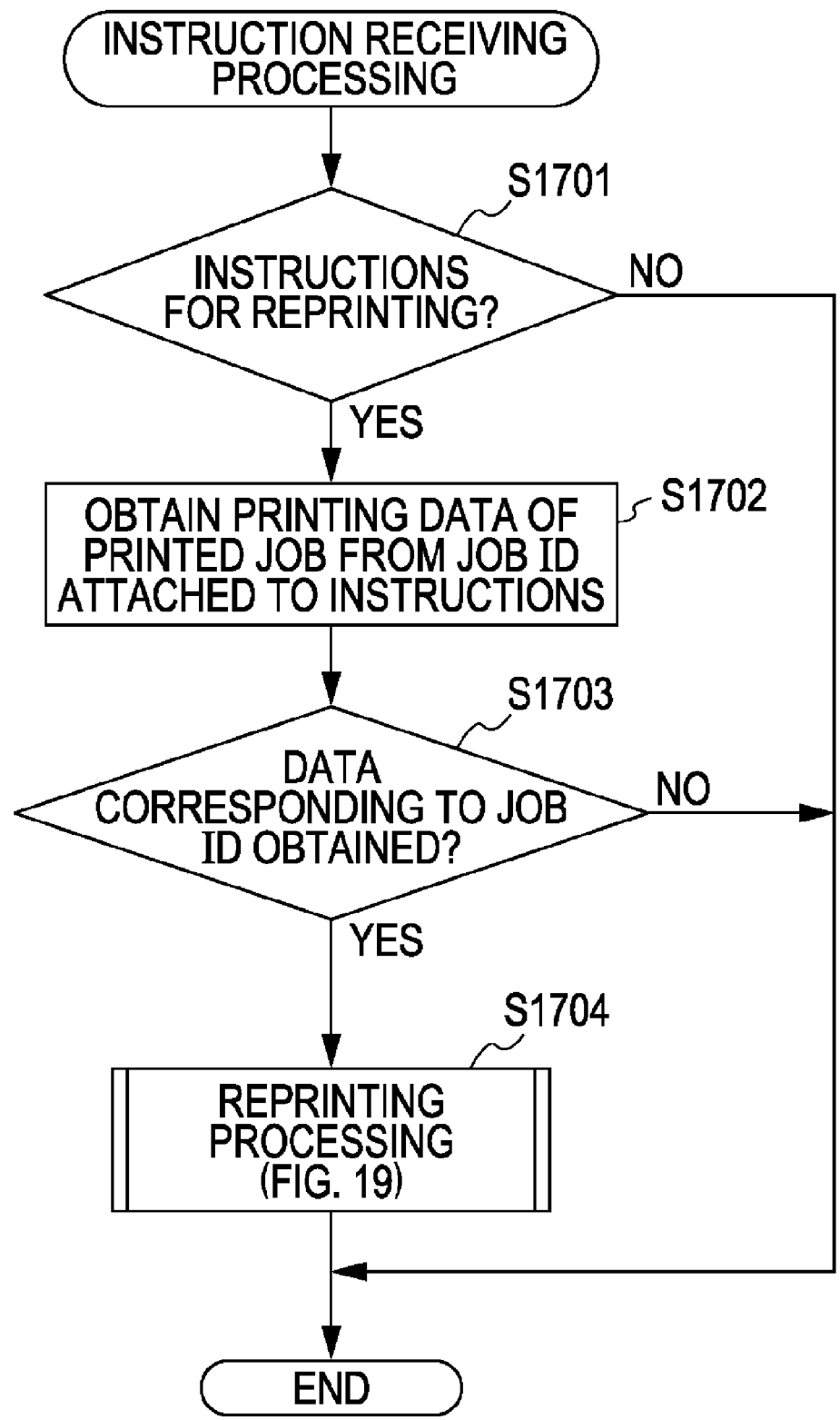
FIG. 18 is a flowchart showing an example of a third control processing sequence relating to the first embodiment.

FIG. 18 is a flowchart showing an example of a third control processing sequence according to the present invention, and is executed by the reprinting request monitoring unit 306 which is executed by the CPU 1 of the host computer 3000. Note that the reference numerals S1701 through S1704 in the diagram represent each of the steps.

First, when the reprinting request monitoring unit 306 receives instructions from the printer 1500, determination is made in step S1701 as to whether or not the received instructions relate to reprinting. If the reprinting request monitoring unit 306 determines that the received instructions are for other than reprinting (NO in step S1701), the processing of the present flowchart is ended.

On the other hand, if the reprinting request monitoring unit 306 determines that the received instructions are for reprinting (YES in step S1701), the flow proceeds to step S1702.

In step S1702, the reprinting request monitoring unit 306 obtains the job ID which is attached to the reprinting instructions, and using this job ID, executes processing to obtain the printing data corresponding to the job ID saved in the external memory 11.

Then in step S1703, the reprinting request monitoring unit 306 determines whether or not the printing data corresponding to the job ID in the processing in step S1702 has been obtained (has existed). Then in the event it is determined that the printing data corresponding to the job ID could not be obtained (did not exist) (NO in step S1703), the processing of the present flowchart is ended.

On the other hand, in the event that the reprinting request monitoring unit 306 determines in step S1702 that the printing data corresponding to the job ID was obtained (did exist) (YES in step S1703), the dialog box 1401 in FIG. 14 is displayed on the CRT 10. Then, when the "OK" button on this dialog box 1401 is clicked with a pointing device and so forth, the flow proceeds to step S1704.

Figure 19:
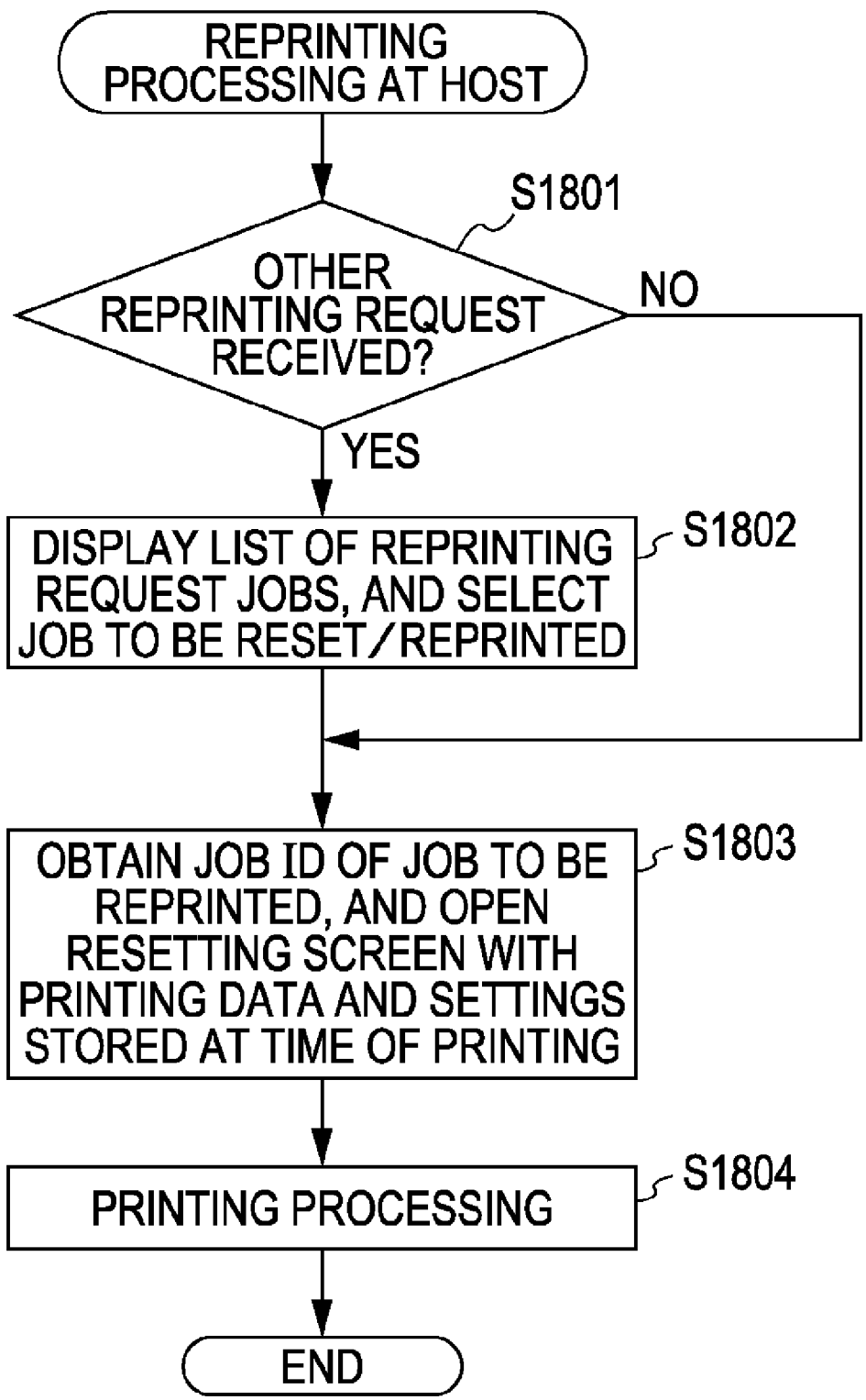
FIG. 19 is a flowchart showing an example of a fourth control processing sequence relating to the first embodiment.

In step S1704, the reprinting request monitoring unit 306 uses the printing data corresponding to the job ID obtained in step S1702 to execute reprinting processing (FIG. 19). Then the processing of the present flowchart is ended.

FIG. 19 is a flowchart showing an example of a fourth control processing sequence according to the present invention, and is executed by the reprinting request monitoring unit 306 which is executed by the CPU 1 of the host computer 3000. Note that the reference numerals S1801 through S1804 in the diagram represent each of the steps.

In step S1801, the reprinting request monitoring unit 306 checks whether or not the host computer 3000 has received reprinting instructions other than a printing instruction request which is determined as reprinting instruction in step S1701 in FIG. 18. Then in the event it is determined that other reprinting instructions have not been received (NO in step S1801), the job corresponding to the above-mentioned printing instructions is assumed to be the reprinting request job, and the flow proceeds to step S1803.

On the other hand, if the reprinting request monitoring unit 306 determines in step S1801 that reprinting instructions other than a printing instruction request which is determined as reprinting instruction in step S1701 in FIG. 18 have been received (YES in step S1801), the flow proceeds to step S1802.

In step S1802, the reprinting request monitoring unit 306 displays a reprinting request job list 1402 (FIG. 14) corresponding to the reprinting instructions received by the host computer 3000 on the CRT 10, and enables selection of the job for reprinting. Then when the reprinting request job is selected with a pointing device and so forth, and the OK button on the dialog box 1401 is operated, the reprinting request monitoring unit 306 advances the flow to step S1803.

In step S1803, the reprinting request monitoring unit 306 obtains a job ID from the reprinting instructions for the job to be reprinted, and obtains the printing data 404, printing setting information 402, and application information 403 corresponding to the job ID. Then as shown in FIG. 15, the reprinting request monitoring unit 306 starts the application 201 corresponding to the application information 403, and performs controls so that the printing screen is opened on the CRT 10 in the state wherein the job having received the reprinting request is printed. Note that the printing settings 402 is controlled to be transferred to the application performing the printing and thus set, if possible. Then, if the application will not accept the printing settings 402, controls are performed to transfer them to the printer driver 203 and perform setting.

In other words, the reprinting request monitoring unit 306 reads the data (printing data 404, printing settings 402, application information 403) relating to the generating of the print job having received a reprinting request from the external memory 11. Further, the reprinting request monitoring unit 306 performs control to set the printing control means (201 through 204, 301 through 305 and so forth in FIG. 3) to the state of that immediately prior to the print job generating, using the data which has been read out.

Next, in step S1804, when the printing settings are changed or printing instructions are made, the application 201 which is executed with the CPU 1 executes printing processing. Thus, a print job is generated with the printing control means (201 through 204, 301 through 305 and so forth in FIG. 3), and is transmitted to the printer 1500. Then the processing of the present flowchart is ended.

Due to the above processing, in the event of performing reprinting with a printing system which performs printing from the host computer 3000 to the printer 1500, reprinting processing can be performed from the user interface of the printer 1500. Further, if necessary, reprinting instructions are performed from the printer 1500 to the printing source host computer 3000, and reprinting can be performed from the user interface of the printing source host computer 3000. In other words, the printer 1500 can specify such that the printing conditions of the printing data for reprinting can be changed at the host computer 3000 to enable a printable state.

In other words, with the printing system of the present embodiment, the print job specified for reprinting is not transmitted to the host computer 3000, but the host computer 3000 is made to enable changes to the printing processing conditions therein. Specifically, a job ID is specified from the printer 1500 and is transmitted to the host computer 3000. With the host computer 3000, the reprinting request monitoring unit 306 enables the print job matching the received job ID to be in a state the same as immediately prior to the sending of the print job. The state of immediately prior to sending indicates the state in which the application generating the print job is opened, and printing processing conditions (the same as the printing processing conditions of an already-printed job) are set at the printer driver. By setting the application program 201 and the printer driver 203 in this state, the advantages described below can be achieved. By clicking the "OK" button on the printing dialog box 1404 with a pointing device or the like, after the settings have been changed on the host computer 3000 side only for the portions the user desires to change, the print job for reprinting can be generated.

Thus, reprinting can be easily performed in situations such as changing the printing processing conditions (such as page layout and so forth) which cannot be changed at the printer 1500, or changing the content of the printing data itself.

Accordingly, when reprinting instructions for a job which is printed with the printing apparatus are performed from the printing apparatus, the reprinting of the job selected on the printing apparatus can be easily performed from an information processing device such as a personal computer or the like.

Second Exemplary Embodiment

Next, a second embodiment of the present invention will be described.

The first embodiment has been described with regard to an arrangement wherein the user selects from (1) or (2) below via the screen in FIG. 12.

(1) Reprinting is performed by the printer 1500 based on printing apparatus side print job data 500 held by the external memory 14.

(2) Reprinting is requested to the host computer 3000.

Here, the print job data 500 used in the method (1) is data wherein the host side print job data 400 received from the host computer 3000 is converted into a bitmap format by the CPU 12 of the printer 1500. Then for example, a situation wherein the image data worth two pages in the host side print job data 400 is specified in a one-page layout (hereafter referred to as a 2-in-1 specification) is assumed. In this case, the printing apparatus side print job data 500 is bitmap data for one page wherein the image data worth two pages is in a one-page layout. Accordingly, even if the CPU 12 attempts to change the layout during reprinting for the layout to be in one-page increments (1-in-1), the printing apparatus side print job data 500 cannot change to the original layout. In other words, when reprinting using the printing apparatus side print job data 500 with the (1) method, specified printing conditions cannot be changed.

Thus, with the first embodiment, the user of the printer 1500 determines whether the printing conditions the user desires to change at time of reprinting are printing conditions which can be handled with the (1) method or not, and based on the determination results thereof, the user needs to select the (1) method or the (2) method. However, in order for the user of the printer 1500 to appropriately select the (1) method or the (2) method, the user needs to know what type of printing conditions can be handled with the (1) method beforehand.

Conversely, the second embodiment relates to a method for appropriately determining the (1) method or the (2) method, even if the user does not know beforehand which of (1) or (2) to select.

Figure 21:
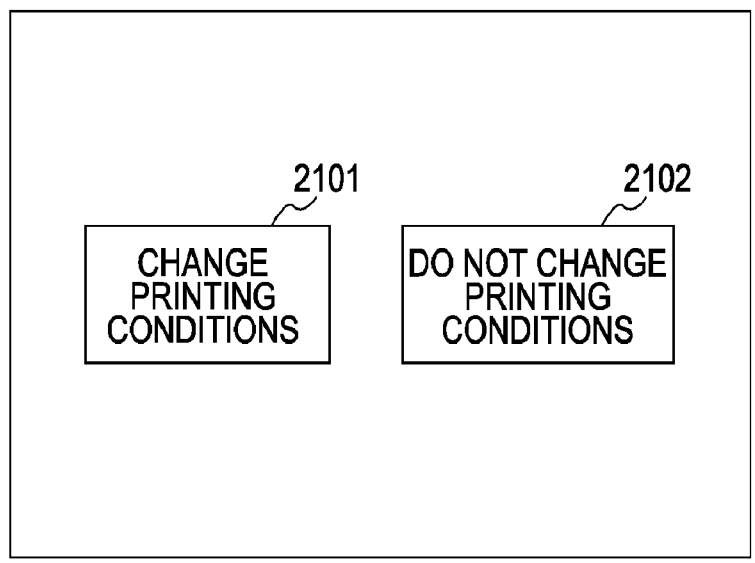
FIG. 21 is a model diagram of a screen shown on the touch panel portion.
Figure 22:
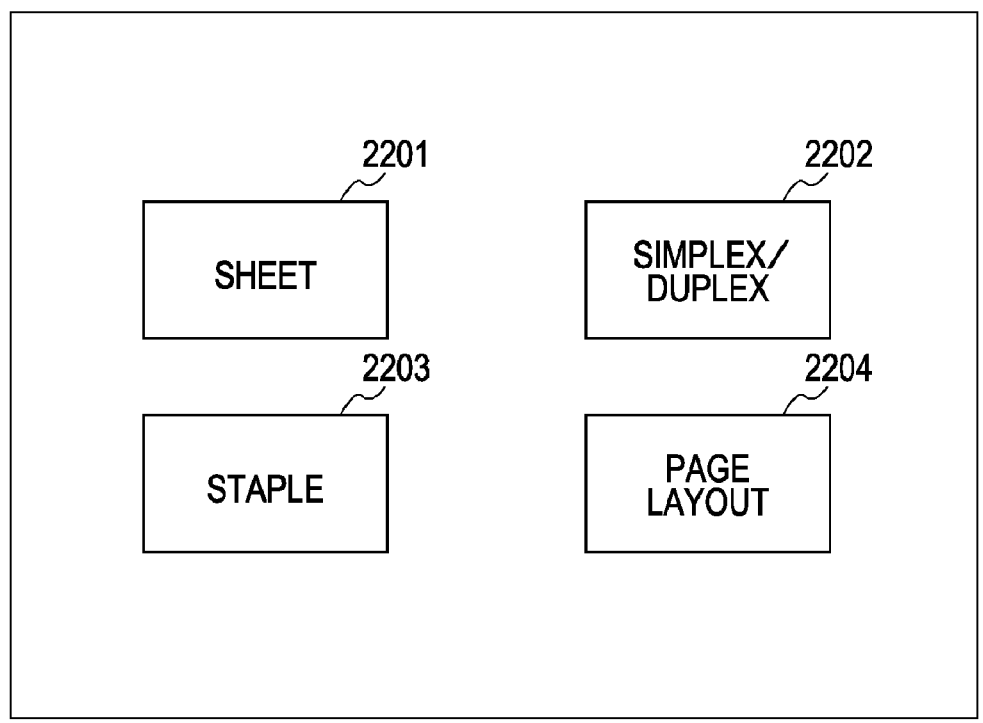
FIG. 22 is a model diagram of a screen shown on the touch panel portion.
Figure 23:
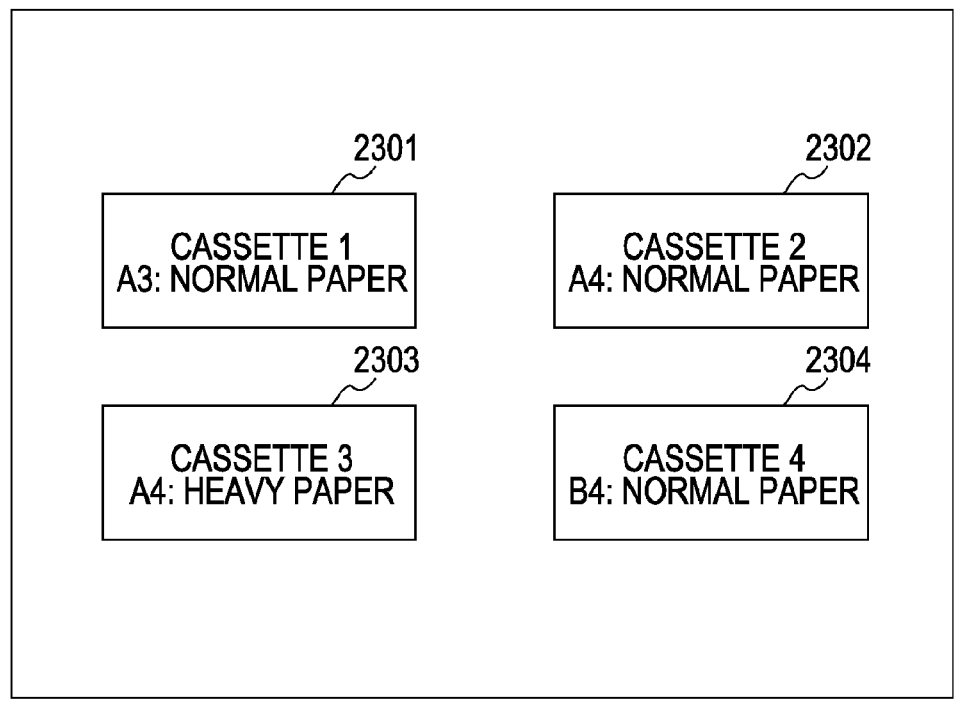
FIG. 23 is a model diagram of a screen shown on the touch panel portion.

In the second embodiment, when the CPU 12 of the printer 1500 determines that the user has selected the "re-execute operator-confirmed jobs" button 1003 via the screen in FIG. 10, the screen shown in FIG. 21 is displayed on the touch panel portion 602. The CPU 12 of the printer 1500 determines whether the use has selected a "change printing conditions" button 2101 via the screen shown in FIG. 21 or has selected a "do not change printing conditions" button 2102. When the CPU 12 of the printer 1500 has determined that the user has selected the "change printing conditions" button 2101, the screen shown in FIG. 22 is displayed on the touch panel portion 602. When changing the printing conditions, the CPU 12 of the printer 1500 determines which of the "sheet" button 2201, "simplex/duplex" button 2202, "staple" button 2203, or "page layout" button 2204 the user has selected. In the event that the CPU 12 of the printer 1500 determines that the user has selected the "sheet" button 2201 via the screen in FIG. 22, the screen shown in FIG. 23 is displayed on the touch panel portion 602. Then the CPU 12 selects the sheets (for example, A3-size normal paper corresponding to cassette 1) corresponding to the button selected by the user via the screen in FIG. 23 (one of 2301, 2302, 2303, 2304) as the paper to be used for reprinting.

Figure 24:
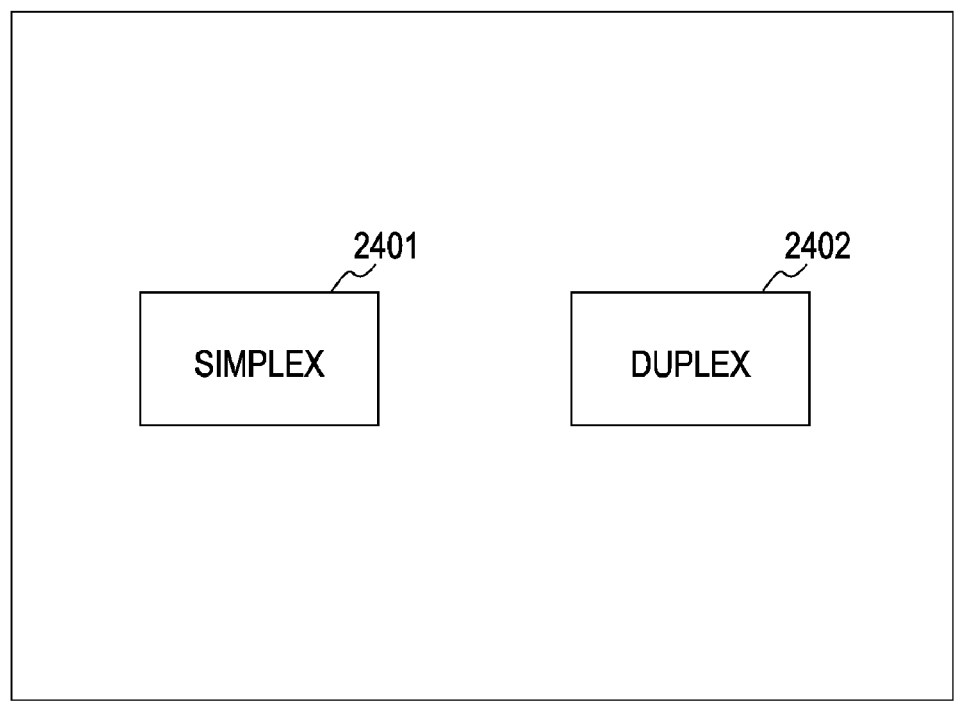
FIG. 24 is a model diagram of a screen shown on the touch panel portion.

Also, in the event that the CPU 12 determines that the user has selected the "simplex/duplex" button 2202 in the screen shown in FIG. 22, the screen shown in FIG. 24 is displayed on the touch panel portion 602. Then if the button selected by the user via the screen in FIG. 24 is the "simplex" button 2401, the CPU 12 sets printing data 505 to perform simplex printing as a printing condition of the reprinting. On the other hand, if the button selected by the user via the screen in FIG. 24 is the "duplex" button 2402, the CPU 12 sets printing data 505 to perform duplex printing as a printing condition of the reprinting.

Figure 25:
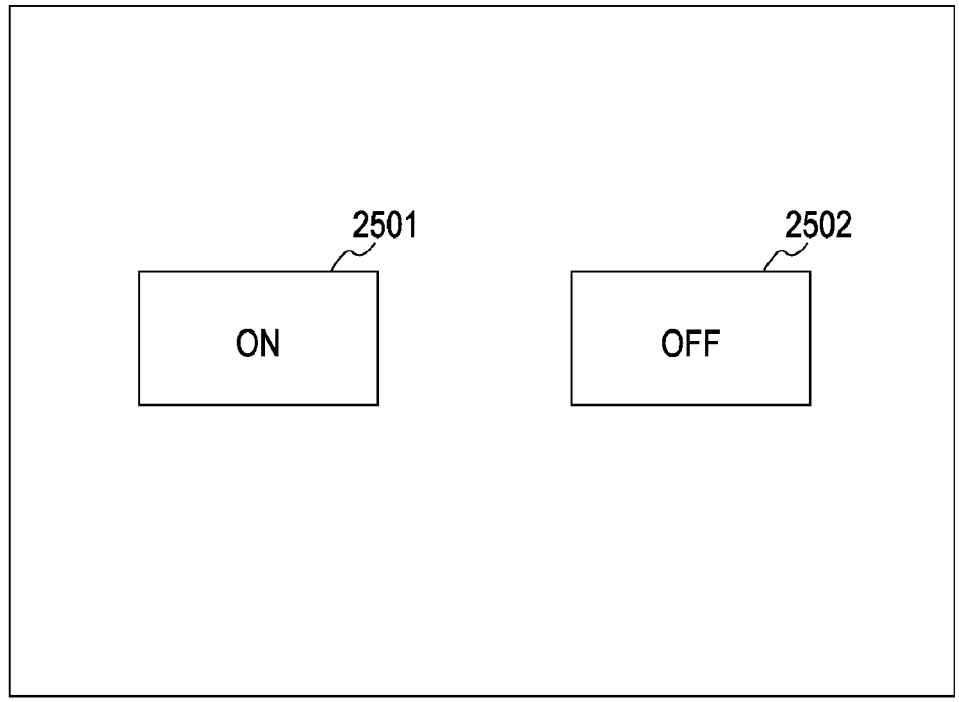
FIG. 25 is a model diagram of a screen shown on the touch panel portion.

Also, if the CPU 12 determines that the user has selected the "staple" button 2203 on the screen shown in FIG. 22, the screen shown in FIG. 25 is displayed on the touch panel portion 602. Then, if the button selected by the user via the screen in FIG. 25 is the "ON" button 2501, the CPU 12 sets the printing data 505 to perform stapling processing on the sheet stack which is subjected to printing processing as a printing condition of the reprinting. On the other hand, if the button selected by the user via the screen in FIG. 25 is the "OFF" button 2502, the CPU 12 sets the printing data 505 to not perform stapling processing on the sheet stack which is subjected to printing processing as a printing condition of the reprinting.

As described above, in the event that the user selects the "sheet" button 2201, the "simplex/duplex" button 2202, or the "staple" button 2203 in FIG. 22, reprinting can be performed based on the printing apparatus side print job data 500, and so printing data 505 included in the printing apparatus side print job data 500 is rewritten.

On the other hand, in the event that the user selects the "page layout" button 2204, the actions differ from the cases wherein the other buttons are selected. Specifically, similar actions are performed as in the case wherein the user selects the "input re-execute request from host" button 1203 in FIG. 12 of the first embodiment. In other words, by executing the flow in FIGS. 18 and 19, the CPU 12 requests reprinting as to the host computer 3000, and causes the host computer 3000 to be in a state wherein the screen shown in FIG. 15 is displayed.

Figure 27:
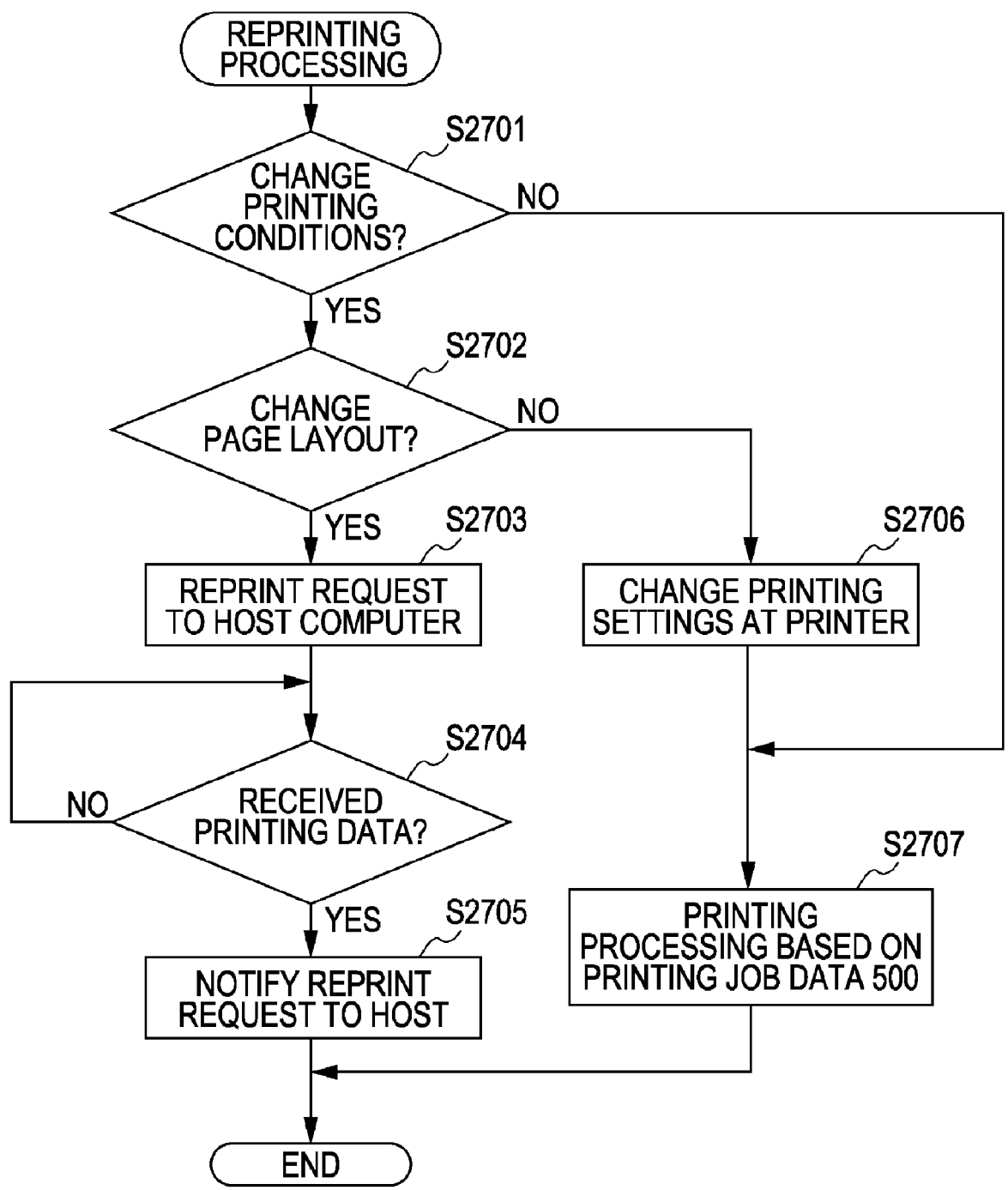
FIG. 27 is a flowchart showing a control processing sequence relating to a second embodiment.

Here, the actions executed by the CPU 12 by displaying the screens in FIGS. 21 through 25 on the touch panel portion 602 will be described with reference to FIG. 27.

In step S2701, the CPU 12 determines which button the user has selected via the screen shown in FIG. 21, and in the event that the "change printing conditions" button 2101 is selected (YES in step S2701), the flow advances to step S2702, and in the event that the "do not change printing conditions" button 2102 is selected (NO in step S2701), the flow advances to step S2707.

In step S2702, the CPU 12 determines whether or not the button selected by the user via the screen in FIG. 22 is the "page layout" button 2204, and in the event that the "page layout" button 2204 is selected (YES in step S2702), the flow advances to step S2703, and if not (NO in step S2702), the flow advances to step S2706.

In step S2703, in order to perform reprinting at the host computer 3000, the CPU 12 extracts the host PC IP address 504 and the job ID 501 from the printing apparatus side print job data 500. Then the CPU 12 sends the reprinting request including the job ID 501 to the host computer 3000 specified by the host PC IP address 504, and the flow proceeds to step S2704. Note that in step S2704, the CPU 12 determines whether or not the host computer 3000 has received the host side print job data 400 corresponding to the reprinting request, which is sent by executing the flow shown in FIG. 19, and in the event that it is received (YES in step S2704), the flow advances to step S2705.

In step S2705, the CPU 12 executes the printing processing received from the host computer 3000 based on the host side print job data 400 corresponding to the reprinting request.

On the other hand, in step S2702, in the event that the CPU 12 determines that the printing condition changes selected by the user are for other than page layout, step S2706 is executed. Specifically, the printing conditions included in the printing data 505 of the printing apparatus side print job data 500 are changed so that the CPU 12 can reprint with the printing conditions set by the user via the screens in FIGS. 23 and 24, and the flow advances to step S2707.

In step S2707, the CPU 12 executes printing processing based on the printing apparatus side print job data 500 wherein the printing conditions are changed in step S2706.

As described above, according to the second embodiment, even if the user does not know which of the above-described (1) or (2) should be selected, the (1) method or the (2) method can be appropriately determined according to the printing conditions set by the user at the time of reprinting.

Figure 26:
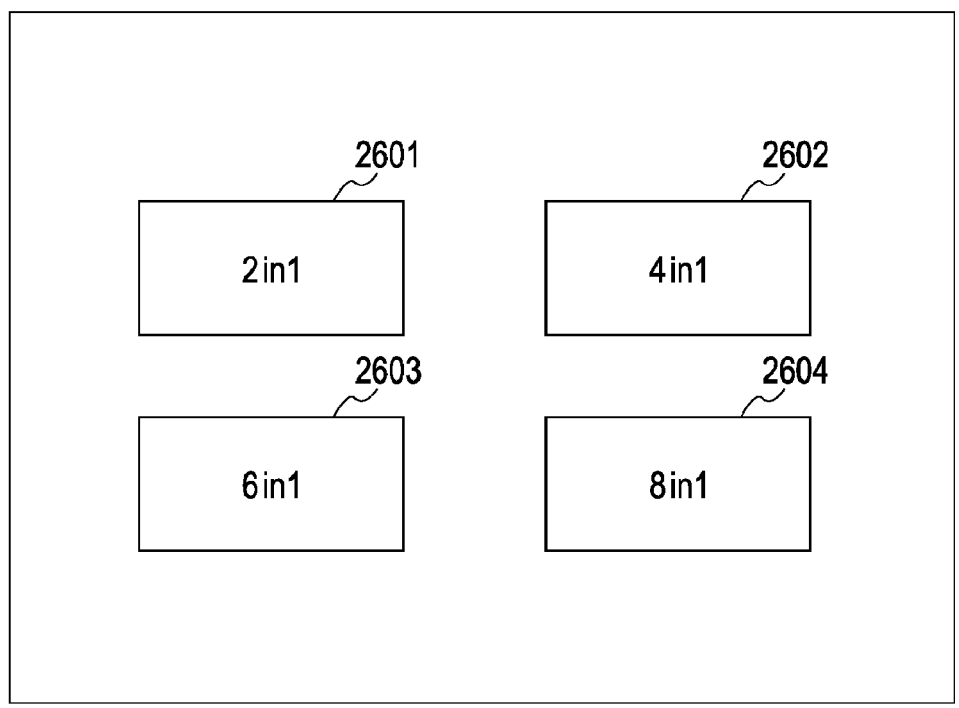
FIG. 26 is a model diagram of a screen shown on the touch panel portion.

Note that with the above description, if the user selects the "page layout" button 2204 via the screen in FIG. 22, the reprinting request including the job ID is assumed to be sent to the host computer 3000, but other arrangements may be made as well. Specifically, in the event that the "page layout" button 2204 is selected via the screen shown in FIG. 22, the screen shown in FIG. 26 is further displayed on the touch panel portion 602, the specific types of page layouts can be offered to the user for selection. In this case, the CPU 12 may include the information showing which page layout method the user has selected via the screen in FIG. 26 in the reprinting request. Then, in the event that the page layout method is included in the reprinting request, the host computer 3000 can be advanced to the screen immediately prior to printing, in the state of reflecting the page layout method. Thus, when executing the reprinting, the host computer 3000 can be in the state immediately prior to sending the print job, with the page layout method specified at the printer 1500 and with the specification thereof reflected. Note that the in the event that printing conditions to be changed for reprinting is included in the reprinting request, the host computer 1500 can be made to send the host side print job data 400 wherein the printing conditions are changed.

It is needless to say that the present invention is not restricted to the above-described configuration of various types of data and the content thereof, and that various configurations or content can be used according to uses or objects.

While embodiments have been described above, the present invention can be carried out in embodiments such as a system, device, method, program, or storage medium and so forth. Specifically, the present invention can be applied to a system configured from multiple devices, or can be applied to a device formed from one unit.

The configuration of the memory map of a storage medium storing various types of data process programs which are readable by an information processing device and a printing apparatus configuring the printing system relating to the present invention will be described with reference to the memory map shown in FIG. 20.

FIG. 20 is a diagram describing a memory map of a storage medium (recording medium) storing various types of data processing programs which are readable with an information processing device (host computer 3000) and printing apparatus (printer 1500) configuring the printing system relating to the present invention.

Note that although not specifically shown in a diagram, information for managing a program group stored in a storage medium, for example version information, creator, and so forth, and information dependent on the operating system and so forth on the program readout side, for example icons and so forth for displaying identification of the programs, may also be stored.

Further, data associated with the various types of programs are also managed by the above directory. Also, there may be cases wherein programs for installing various programs onto a computer, or programs for decompressing in the event that a program being installed has been compressed, are also be stored.

The functions shown in FIGS. 16 through 19 according to the present embodiment may be implemented by the host computer with programs installed externally. In such cases, the present invention can be applicable even when the information group including the program is supplied to an output device from an external storage medium via a network, or by a storage medium such as a CD-ROM, flash memory, FD, and so forth.

As described above, storage media having recorded the program code for the software to realize the functions of the embodiment as described above are supplied to the system or to the device. It goes without saying that the objects of the present invention are achieved by the computer (or CPU or MPU) of the system or device to readout and execute the program code stored in the storage medium.

In such cases, the program code itself which is read out from the storage medium realizes the new functions of embodiments of the present invention, the storage medium storing this program code configures embodiments of the present invention.

Accordingly, the program can have any program format such as object code, a program executed by an interpreter, script data supplied to the operating system, and so forth, as long as it has the functions of the program.

As a storage medium for supplying the program, for example a flexible disk, hard disk, optical disk, magneto-optical disk, MO, CD-ROM, CD-R, CD-RW, magnetic tape, non-volatile memory card, ROM, DVD, and so forth can be used.

In this case, the program code itself read out from the storage medium realizes the functions of the embodiments as described above, and the storage medium having stored the program code configures the present invention.

As another method for supplying the program, connecting to an Internet home page using a browser on the client computer, and downloading the program itself of the present invention from the home page to a storage medium such as a hard disk can also be performed to supply the program. Also, a file including compression and automatic installation functions can be downloaded from the home page to a storage medium such as a hard disk to supply the program. Also, supplying the program can be achieved by dividing the program code configuring the program of the present invention into multiple files, and having each of the files to be downloaded from different web pages. In other words, a WWW server or FTP server which enables multiple users to download the program files for realizing the function processing according to the present invention with a computer are also included in the scope of claims of the present invention.

Also, the program of the present invention can also be encoded and stored on a storage medium such as a CD-ROM and distributed to users. Further, for users having cleared predetermined conditions, key information for decoding the code can be downloaded from a web page via the Internet. Further, by using this key information, the encoded program can be executed and realized by installing the program onto the computer.

Also, by executing the program code read out by the computer, not only are the functions according to the above-described embodiment realized, but it goes without saying that the following configurations are also included. For example, based on instructions from the program code, the operating system which is running on the computer can perform a portion or all of the actual processing, thus the functions according to the above-described embodiment can be realized, and this is included as well.

Further, it goes without saying that an arrangement is included wherein the program code read out from the storage medium is written into the memory attached to a function expansion unit which is connected to a computer or a function expansion board inserted into a computer, whereupon, based on the instructions from the program code written into this memory, the function expansion board or the CPU and so forth attached to the function expansion unit performs a portion or all of the actual processing, thereby realizing the functions of the above-described embodiment by the processing thereof.

Also, the present invention may be applied to a system configured from multiple units or from a device formed from one unit. Also, it goes without saying that the present invention can be applicable in cases of being realized by supplying the program to a system or device. In such a case, the system or device can obtain the advantages of the present invention by reading the storage medium having stored the program therein illustrated by the software for the purpose of achieving the present invention to the system or device.

The present invention is not limited to the above-mentioned embodiments, but can take various forms (including organic combinations of the various embodiments) based on the intent of the present invention, and these are not to be excluded from the scope of the present invention.

Various examples and embodiments have been shown to describe the present invention, however, it will be apparent to one skilled in the art that the present invention should not be restricted thereto, and that various modifications and adaptations can be made without departing from the spirit and scope of the present invention.

As shown above, with the present embodiment, when performing reprinting with a printing system for performing printing from the host computer to the printing apparatus, reprinting processing can be performed from the user interface of the printing apparatus. Further, if needed, reprinting instructions can be made from the printing apparatus side to the printing source host computer, and the state of the host computer can be controlled so that reprinting from the user interface of the printing source host computer can be easily performed.

Note that configurations combining the various modification examples shown with the above-described embodiments are all also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-048942 filed Feb. 24, 2006, which is hereby incorporated by reference herein in its entirety.

What is claimed is:

1. A printing system comprising:
an information processing apparatus; and
a printing apparatus which receives print jobs transmitted from the information processing apparatus and performs printing processing;
the information processing apparatus including
a first holding unit configured to hold application data which can be used by an application program which is executable by the information processing apparatus,
a generating unit configured to generate a print job based on the application data held by the first holding unit;
a transmitting unit configured to transmit the print job generated by the generating unit to the printing apparatus, and
a first control unit configured to control the print job to be transmitted by the transmitting unit, in the case that a reprinting request is received from the printing apparatus for executing reprinting based on the application data held by the first holding unit,
and the printing apparatus including
a receiving unit configured to receive the print job transmitted by the transmitting unit of the information processing apparatus,
a converting unit configured to convert the print job received by the receiving unit into printing data,
a second holding unit configured to hold the printing data converted by the converting unit,
a printing unit configured to execute printing processing based on the printing data converted by the converting unit,
a changing unit configured to change at least one of a plurality of printing conditions in a case where reprinting of the print job is to be executed by the printing apparatus, based on the data held by the first holding unit or the second holding unit,
a selecting unit configured to select whether to execute reprinting based on the application data held by the first holding unit or to execute reprinting based on printing data held by the second holding unit, according to the at least one of a plurality of printing conditions changed with the changing unit, and
a second control unit configured to perform control such that, in an event that the selecting unit selects executing of reprinting based on the application data, the reprinting request is transmitted to the information processing apparatus, and in an event that executing of reprinting based on the printing data is selected, reprinting based on the printing data held by the second holding unit is performed.

2. The printing system according to claim 1, wherein the selecting unit selects executing of reprinting based on the application data held by the first holding unit in the event that the at least one of a plurality of printing conditions changed by the changing unit relate to page layout.

3. The printing system according to claim 1, wherein the printing apparatus has an extracting unit configured to extract specified information which specifies a print job corresponding to the reprinting based on history information related to the printing data wherein printing processing is performed by the printing unit;

and wherein the second control unit transmits the reprinting request including the specified information extracted by the extracting unit to the information processing device, in the event that the selecting unit selects executing of reprinting based on the application data;

and wherein the first control unit performs control to transmit the print job based on the application data corresponding to the specified information to the transmitting unit, in the event that the reprinting request including the specified information is received.

4. The printing system according to claim 1, wherein the first control unit perform control such that the generating unit is in a state capable of generating print jobs based on the application data, according to the reprinting request being received from the printing apparatus.

5. The printing system according to claim 1, wherein the first control unit causes the generating unit to generate print jobs corresponding to the changing information, in the event that the reprinting request received by the printing apparatus includes changing information for the purpose of changing the at least one of a plurality of printing conditions.

6. The printing system according to claim 1, wherein the first holding unit limit data holding based on a previously set holding data count or amount of empty memory resources;
and wherein the second holding unit limits data holding based on the previously set holding data count or amount of empty memory resources.

7. A printing apparatus which receives a print job from an information processing apparatus having a first holding unit which stores application data and performs printing processing, the printing apparatus comprising:
a receiving unit configured to receive the print job from the information processing apparatus;
a converting unit configured to convert the print job received by the receiving unit into printing data;
a second holding unit configured to hold the printing data converted by the converting unit;
a printing unit configured to execute printing processing based on the printing data converted by the converting unit;
a changing unit configured to change at least one at least one of a plurality of printing conditions in a case where reprinting of the print job is to be executed by the printing apparatus, based on the data held by the first holding unit or the second holding unit;
a selecting unit configured to select whether to execute reprinting based on the application data held by the first holding unit or to execute reprinting based on printing data held by the second holding unit, according to the at least one of a plurality of printing conditions changed with the changing unit; and
a control unit configured to perform control such that, in an event that the selecting unit selects executing of reprinting based on the application data, the reprinting request is transmitted to the information processing apparatus, and in an event that executing of reprinting based on the printing data is selected, reprinting based on the printing data held by the second holding unit is performed.

8. The printing apparatus according to claim 7, wherein the selecting unit selects executing of reprinting based on the application data hold by the first holding unit in the event that the at least one of a plurality of printing conditions changed by the changing unit relate to page layout.

9. The printing apparatus according to claim 7, wherein the printing apparatus has an extracting unit configured to extract specified information which specifies a print job corresponding to the reprinting based on history information related to the printing data wherein printing processing is performed by the printing unit;

and wherein the control unit transmits a reprinting request including the specified information extracted by the extracting unit to the information processing device, in the event that the selecting unit selects executing of reprinting based on the application data.

10. The printing apparatus according to claim 7, wherein the first holding unit limits data holding based on a previously set holding data count or amount of empty memory resources;

and wherein the second holding unit limits data holding based on the previously set holding data count or amount of empty memory resources.

* * * * *